US012334698B2

(12) United States Patent
Frenken

(10) Patent No.: US 12,334,698 B2
(45) Date of Patent: Jun. 17, 2025

(54) PRESSING PLIERS

(71) Applicant: Gustav Klauke GmbH, Remscheid (DE)

(72) Inventor: Egbert Frenken, Heinsberg (DE)

(73) Assignee: Gustav Klauke GmbH, Remscheid (DE)

( * ) Notice: Subject to any disclaimer, the term of this patent is extended or adjusted under 35 U.S.C. 154(b) by 0 days.

(21) Appl. No.: 18/040,020

(22) PCT Filed: Aug. 6, 2021

(86) PCT No.: PCT/EP2021/072072
§ 371 (c)(1),
(2) Date: Jan. 31, 2023

(87) PCT Pub. No.: WO2022/029320
PCT Pub. Date: Feb. 10, 2022

(65) Prior Publication Data
US 2023/0275382 A1 Aug. 31, 2023

(30) Foreign Application Priority Data
Aug. 6, 2020 (DE) ......................... 102020120825.1

(51) Int. Cl.
*B23P 19/00* (2006.01)
*B25B 7/04* (2006.01)
(Continued)

(52) U.S. Cl.
CPC ........... *H01R 43/0428* (2013.01); *B25B 7/04* (2013.01)

(58) Field of Classification Search
CPC ...... H01R 43/0428; B25B 7/04; B25B 27/146
See application file for complete search history.

(56) References Cited

U.S. PATENT DOCUMENTS 4,199,972 A 4/1980 Wiener
5,531,141 A * 7/1996 Gilbert, Jr. ................ B25B 7/02 81/424.5

(Continued)

FOREIGN PATENT DOCUMENTS

DE 2548901 A1 10/1976
EP 3179580 A1 6/2017

(Continued)

OTHER PUBLICATIONS

International Search Report and Written Opinion for PCT/EP2021/072072 mailed dated Feb. 18, 2022, 30 pages.

*Primary Examiner* — Paul D Kim
(74) *Attorney, Agent, or Firm* — Klintworth & Rozenblat LLP

(57) ABSTRACT

Pressing jaws are opposingly arranged in pressing pliers. Each pressing jaw has ribs with a longitudinal extension which is transverse to an entry direction of the ribs into entry openings of the other pressing jaw. A pressing mouth has a pressing opening with an opening contour formed by free marginal edges of the ribs. The ribs form an intersection of the opening contour that moves in the direction of the longitudinal extension during a pressing operation. A supplemental pressing part forms part of the opening contour and is arranged so as to cover several ribs and overlap the intersection. A method of use is also provided.

14 Claims, 22 Drawing Sheets

(51) Int. Cl.

| | |
|---|---|
| ***H01R 43/00*** | (2006.01) |
| ***H01R 43/042*** | (2006.01) |

(56) References Cited

U.S. PATENT DOCUMENTS

| | | | | |
|---|---|---|---|---|
| 6,151,950 | A * | 11/2000 | Wilhelm .............. | H01R 43/042 29/751 |
| 9,993,885 | B2 | 6/2018 | Frenken | |
| 10,468,847 | B2 | 11/2019 | Frenken | |
| 11,682,875 | B2 * | 6/2023 | Weisheit .............. | H01R 43/058 72/409.12 |
| 2017/0201056 | A1 | 7/2017 | Malloy et al. | |

FOREIGN PATENT DOCUMENTS

| | | | |
|---|---|---|---|
| WO | WO2014009363 | A1 | 1/2014 |
| WO | WO2014108361 | A1 | 7/2014 |

* cited by examiner

PRESSING PLIERS

AREA OF TECHNOLOGY

Described and disclosed are pressing pliers comprising a first and a second pressing jaw, wherein the pressing jaws can be moved in a traversing direction against each other to perform a pressing operation, wherein the pressing jaws further have ribs with a longitudinal extension transverse to the traversing direction, and wherein entry openings are left between the ribs, into which the ribs of the respective other pressing jaw can enter during a pressing operation, wherein, in addition, a pressing mouth formed by the pressing jaws has a pressing opening with an opening contour formed by free marginal edges of the ribs.

In addition, the disclosure relates to pressing jaws provided so as to be arranged opposite each other in pressing pliers, wherein the pressing jaws have ribs with a longitudinal extension transverse to the traversing direction of the pressing jaws, and wherein entry openings are left between the ribs, into which the ribs of the respective other pressing jaw can enter during a pressing operation, wherein, in addition, a pressing mouth formed by the pressing jaws has an opening contour formed by free marginal edges of the ribs, and wherein the entering ribs form an intersection that wanders in the direction of the longitudinal extension during a pressing operation.

Described and disclosed is further an arrangement of pressing pliers with opposing pressing jaws, wherein the pressing jaws have ribs with a longitudinal extension transverse to a traversing direction of the pressing jaws, and wherein entry openings are left between the ribs, into which the ribs of the respective other pressing jaw can enter during a pressing operation, wherein, in addition, a pressing mouth formed by the pressing jaws has an opening surface with an opening contour formed by free marginal edges of the ribs, and wherein the entering ribs form an intersection that wanders in the direction of the longitudinal extension during a pressing operation.

Described and disclosed is further a method for manufacturing a pressed part (pellet) by moving pressing jaws that have ribs against each other, wherein the ribs have a longitudinal extension transverse to the traversing direction, and enter into entry openings between the ribs of the other pressing jaw during a pressing operation, wherein, in addition, a pressing mouth formed by the pressing jaws has a pressing opening, which is defined by an opening contour formed by free marginal edges of the ribs, wherein the entering ribs form an intersection in the opening contour that wanders in the direction of the longitudinal extension of the ribs during a pressing operation, wherein the manufactured pellet further has a pressing contour.

In addition, the disclosure relates to a method for pressing a pressed part (pellet) by moving pressing jaws that have ribs against each other, wherein the ribs, which have a longitudinal extension transverse to the traversing direction of the pressing jaws, enter into entry openings between the ribs of the other pressing jaw during a pressing operation, wherein, in addition, a pressing mouth formed by the pressing jaws has a pressing opening, which is defined by an opening contour formed by free marginal edges of the ribs, wherein the entering ribs form an intersection in the opening contour that wanders in the direction of the longitudinal extension of the ribs during a pressing operation.

PRIOR ART

Pressing pliers and pressing jaws of the kind in question, wherein pressing pliers can also be referred to as crimping pliers, are known, and used to press wire end ferrules on insulated conductor ends, for example. The pressing jaws are designed for comb-like interlocking during the pressing operation, wherein ribs of the one pressing jaw can enter into slitted entry openings of the other pressing jaw. Each pressing jaw here preferably has a plurality of ribs that are arranged one after the other, perpendicular to the entry direction of the pressing jaws, and spaced apart from each other. The entry openings preferably arise in the distance areas between the ribs of the respective other pressing jaw.

Further known in this conjunction is that the ribs of both pressing jaws border an essentially square opening contour of the pressing mouth, wherein the opening contour diminishes, preferably uniformly, relative to its edge lengths and the pressing opening cross sectional surface during an interlocking of the pressing jaws or their ribs.

The opening contour borders an opening surface of the pressing mouth. In the known pressing pliers or pressing jaws, the opening contour integrates intersections, projected in the opening surface, between ribs that enter into entry openings of the one pressing jaw and the ribs of the one pressing jaw that leave the entry openings between them. Depending on the number of ribs, a plurality of such intersections arise in a depth direction of the pressing mouth, perpendicular to the opening surface. As a rule, these intersections are each aligned one after the other in the depth direction. A connecting line for the intersections preferably forms a punctiform image in the opening contour. The intersections or the point of the opening contour that represents the intersections wanders from the outside in during the interlocking of the pressing jaws, as part of the inwardly wandering area of the opening contour, in the direction toward an opening surface midpoint, and also in the direction of the longitudinal extension of the ribs. Two such intersections or points of the opening contour are usually given, which essentially wander toward each other during the interlocking of the pressing jaws.

Known pressing jaw pairs with the rib-like structure described here, like those preferably used for crimping wire end ferrules, are put together in such a way that the pressing jaws can be completely parted. This can make allocation difficult. In addition, a disadvantage may arise for electromotively or hydraulically activated pressing tools that are designed with these types of pressing jaws. Parting the jaws of this tool, in which the pressing jaws are in turn mounted, can result in an open position that is undesirably large.

For example, pressing pliers with these types of pressing jaws are known from EP 3 179 580 A1. A method for manufacturing a pellet during the use of these types of pressing jaws is also known, as is a method for pressing with pressing jaws that have ribs. During a pressing operation, an unevenness of the pellet can arise, for example when material of the pellet is displaced between the interlocking ribs. In particular, such a problem is encountered for comparatively large opening contours.

SUMMARY OF THE DISCLOSURE

With regard to the described prior art, the disclosed device in form of pressing jaws, a pair of pressing jaws or an arrangement of pressing pliers or a pressing jaw pair or a method for pressing is concerned with the object to indicate a or pressing jaws device or pressing jaws of the kind in question by which even in case of comparatively large pellets a good pressing result is to be achievable. Preferably with the same pressing jaws for both smaller and larger pellets. In addition, the object is to advantageously design a method of the kind in question, in particular with regard to a pressing result to be achieved. In addition, the object is to indicate an advantageous pair of pressing jaws.

A possible solution of the object is given for pressing pliers with the emphasis on providing a supplemental pressing part which, in addition to the ribs, forming part of the opening contour, arranging the supplemental pressing part so as to run transverse to the marginal edges while overlapping several ribs, and having the intersection be outside of the opening contour.

An advantageous pressing result can still be achieved by such a configuration, in particular even given comparatively large pellets. In addition, such a configuration makes it possible to press both comparatively small and comparatively large pellets in the same pressing jaws, without requiring that the pressing jaws be replaced. It is also preferred that the pressing operation be performed in a force-controlled or force controllable manner, in particular with pressing jaws that have a supplemental pressing part as described here. With respect to a force-controlled pressing, for example, reference is to be made to WO 2014/108361 A1, the content of which is completely incorporated into the disclosure of the present application, in particular also for including features of this publication in claims of the present application. Among other things, it is essential here that partial pistons be provided in the same hydraulic cylinder while hydraulically acting on a pressing jaw, wherein a pressing part or a pressing jaw exerts a maximum pressing force only given a final pressing position inside of a first partial traversing path, and exerts a partial pressing force that is lower relative to the maximum pressing force only given a final pressing position within a second partial traversing path that follows the first partial traversing path. The partial pressing forces are here preferably each allocated to a partial piston.

With respect to the pressing jaws provided so as to be oppositely arranged in pressing pliers, the object is achieved with regard to an advantageous configuration of the pressing jaws by virtue of the fact that a supplemental pressing part is provided, which, in addition to the ribs, forms part of the opening contour, the supplemental pressing part is arranged so as to run transverse to the marginal edges while overlapping several ribs, and the intersection is outside of the opening contour.

As relates to the pressing jaw pair with a first and a second pressing jaw, one solution to the object can involve directly connecting the pressing jaws with each other, so that during an opening motion, the pressing jaws can only be moved relative to each other up to an end of a largest traversing distance at which the connection between the pressing jaws still exists.

With respect to the method for manufacturing a pellet, the object can be solved by inserting a supplemental pressing part into the pressing mouth so as to change the pressing contour of the pellet, which replaces a part of the opening contour of the pressing opening formed by the pressing jaws, wherein the supplemental pressing part is inserted so as to overlap the edge point of the opening contour formed by the entering ribs.

As relates to the method for pressing with pressing jaws that have ribs, one solution to the object can involve inserting a supplemental pressing part into the pressing opening before the pressing operation starts, which forms a supplemental part of the opening contour over a depth of the pressing opening, while crossing at least two ribs of the same pressing jaw and overlapping the edge point, and moving the supplemental pressing part relative to the ribs during the pressing operation.

The supplemental pressing part can be designed for a preferred use during each pressing process, correspondingly be part of a pressing jaw, for example. However, it can alternatively also only be employed as an option, for which purpose the supplemental pressing part can be present as a loose part, for example, which can correspondingly be arranged in the area of the pressing mouth for executing a pressing process.

By arranging the supplemental pressing part in the area of the pressing mouth, the supplemental pressing part can be used to partially change the opening contour defined by the ribs. For example, a conventional square, further preferably quadratic, opening contour formed by the marginal edges of the ribs can be changed into an opening contour that deviates from this square contour by using the supplemental pressing part, which covers a partial area of the ribs and thereby alters the opening contour. In addition, arranging the supplemental pressing part makes it possible to quasi resolve the intersection of the ribs that wanders during the pressing process, and changes it into a plurality of contacting points and into a supplemented part of the opening contour or an edge line that determines the opening contour. In addition, the angle at which the marginal edges and an edge of the supplemental pressing part collide can advantageously be made relatively large.

With regard to the in particular possible pressing of relatively large pellets that are still distinctly larger even after pressing than comparatively small pellets after pressing in an embodiment as described herein, in particular an essentially quadratic opening contour is also preferred. Such a quadratic opening contour further enables the wire end ferrule to fold inwardly during the pressing operation while pressing a wire end ferrule outside of corner areas, in any case given comparatively large pellets. This advantageously makes it possible to improve the connection with the wires, both with regard to an extraction force, and with regard to an electrical connection.

In particular, comparatively large pellets are those whose cross sectional surface (before pressing) is larger than 10 $mm^2$, further also larger than 50 $mm^2$ up to about 200 or 250 $mm^2$ or even larger.

The supplemental pressing part used as a kind of crown cover here preferably extends in a direction perpendicular to the traversing direction of the pressing jaws and in a depth direction of the pressing mouth, while covering a plurality of ribs, in particular while covering a plurality of ribs of both pressing ribs, and further preferably over at least two ribs of a pressing jaw. In a preferred embodiment, the supplemental pressing part can essentially extend over all ribs of a pressing jaw or over all ribs of both pressing jaws interlocked during a pressing operation. This covering preferably arises in the area of the intersection that arises where the ribs of both pressing jaws start to be covered and wanders inwardly during the pressing process in relation to the pressing mouth, corresponding to the gusset that arises between the ribs of the two pressing jaws during the interlocking of the pressing jaws. The covering relocates the intersection to the outside of the opening contour.

The change in the opening contour made by the supplemental pressing part leads to a corresponding change in the pressing contour of the pellet. The partial area of the opening contour given by the supplemental pressing part is in this way preferably mirrored in the pressing contour of the pellet.

The supplemental pressing part can be used to achieve an advantageous improvement in the manufacture of a pellet, in particular as a result of the supplemental pressing part covering the gusset area of the pressing opening that defines the interface. In this way, an undesired burr formation of the pellet in the gusset area of the pressing opening can be countered by correspondingly arranging the supplemental pressing part. By covering the intersection or the gusset area according to the disclosure and removing it from the opening contour, the pellet is prevented from being partially pressed into the entry openings between the ribs during the pressing operation and accompanying interlocking of the ribs of both pressing jaws, which would have resulted in the undesired burr formation.

Inserting a supplemental pressing part in relation to a length of the pellet viewed perpendicular to the entry direction also enables the manufacture of comparatively long pellets in relation to a depth direction of the pressing mouth, correspondingly while using an adjusted number of ribs of a pressing jaw. In this way, use can be made of pressing jaws with more than ten ribs arranged one after the other, or more, for example up to twenty or thirty or more.

With regard to the opening surface of the pressing opening bordered by the opening contour, two interfaces that essentially move toward each other preferably arise during the pressing process given what is usually a square, possibly quadratic, opening surface without the supplemental pressing parts. Therefore, the arrangement of two supplemental pressing parts that cover the intersections is preferably provided.

The object with respect to an advantageous configuration of the pair of pressing jaws according to another inventive idea can be resolved by directly connecting the pressing jaws with each other, so that the pressing jaws cannot be moved relative to each other beyond a largest traversing path without undoing the connection. This configuration of the pressing jaws also has significance for corresponding pressing jaws in which no supplemental pressing part is provided in the sense described here.

Such a configuration yields a defined final traversing position of the pressing jaws, in particular in an initial position of the pressing jaws, in which a maximum size of the pressing opening arises. Connecting the pressing jaws with each other prevents the pressing jaws from further shifting beyond this final traversing position. During an opening movement, the pressing jaws can only be moved up to the end of a largest traversing path at which the pressing jaws are still connected, however.

In this final traversing position defined in this manner, the ribs of the pressing jaws can still interlock in a comb-like manner. The defined traversing position can also be a position of the pressing jaws relative to each other in which the ribs of the one pressing jaw have completely exited the entry openings of the other pressing jaw.

The connection also allows the pressing jaws to be captively coupled with each other. For example, this is beneficial for interchangeable pressing jaws that can optionally be allocated to a corresponding tool or a handheld device to produce a pressing.

The pressing jaws can be part of a hand tool, for example a pincer-like hand tool, or even part of a pressing device, for example a hydraulically activatable pressing device, or be allocated to such a hand tool or to such a pressing device in the form of interchangeable pressing jaws.

The features of the independent claims described above are both significant when each is taken separately and also important in any combination with each other, wherein features of an independent claim can further be combined with the features of another independent claim, or with features of several independent claims, and further also only just with individual features of one or several of the additional independent claims.

Even in the description of the figures, additional features are often described below in their preferred allocation to the subject matter of claim 1 and/or one or several of the additional independent claims or to features of additional claims. However, they can also be allocated to only individual features of claim 1 and/or one or several of the additional independent claims or the respective additional claim, or each be important independently.

The supplemental pressing part can be movably arranged relative to the rib, so as to in this way wander during the pressing process or during the interlocking of the pressing jaws with the intersection of the opening contour. The intersection or the gusset that arises in this area between the ribs of both pressing jaws is preferably always covered by the supplemental pressing part during the pressing process. In particular, the supplemental pressing part can here move along the marginal edges of the ribs that are oppositely directed in the traversing direction of the pressing jaws and intersect each other at the point of intersection, possibly and as also preferred with the supplementary pressing part supported on at least one of these marginal edges. A sliding movement of the supplemental pressing part along the marginal rib edges preferably arises during an interlocking of the pressing jaws.

In another embodiment, the cross section of the supplemental pressing part can run according to the legs of a triangle in its areas adjacent to the ribs. The legs can here include a 90° angle relative to each other, in particular given a quadratic opening surface of the pressing opening without a supplemental pressing part. The legs of the supplemental pressing part as adjusted to the angle given by the marginal edges of the ribs of both pressing jaws that intersect at the point of intersection can also include an angle of less than 90 degrees or even an angle of more than 90 degrees relative to each other, for example an angle of 60 to 120 degrees.

The cross sectional marginal edge of the supplemental pressing part that connects these legs can run along a straight line like a hypotenuse, here preferably being essentially aligned in the traversing direction of the pressing jaws. For example, this marginal edge can also run along a curved line while directed outwardly or alternatively inwardly, so that a convex or concave curvature of the marginal edge can arise.

The supplemental pressing part can initially be secured by a spring connection to an edge area of a pressing jaw or a tool part that holds a pressing jaw.

The supplemental pressing part can also be positively retained on one or both pressing jaws. This positive mounting allows the supplemental pressing part to be movable while interlocking the pressing jaws. In this way, the supplemental pressing part can be retained, if necessary captively, on at least one pressing jaw, and thereby be a component of the one or both pressing jaws. In a possible configuration, the positive connection can be released, if necessary without a tool, for example to change out the supplemental pressing part for a supplemental pressing part that changes the opening contour, or to enable a pressing operation without a supplemental pressing part. The positive mounting can also be non-releasable, i.e., only destructively releasable, as a result of which the supplemental pressing part always remains a component of at least one of the pressing jaws.

For purposes of positive mounting, the supplemental pressing part can have one or several mounting arms, which proceed from the supplemental part in relation to the opening contour and extend to the outside of the opening contour.

In this regard, two such mounting arms can be provided on the supplemental pressing part, wherein, in a preferred configuration, a mounting arm of the supplemental part can be allocated to each pressing jaw to produce the positive mounting.

In this way, at least one pressing jaw, preferably both pressing jaws, can have one or more mounting surfaces, along which a mounting arm of the supplemental pressing part can slide during a pressing operation. The mounting surfaces can here each be allocated to the ribs, and her possibly run parallel to and spaced apart from the marginal edges that define the opening contour. The mounting surfaces here preferably form sliding surfaces for the mounting arms. As a result of this also sliding positive connection, the supplemental pressing part is held in the covering position of the intersection and in its alignment within the opening contour, independently of the insertion depth of the one pressing jaw into the other pressing jaw.

The mounting surface can run essentially parallel to an allocated marginal rib edge so as to precisely guide the supplemental pressing part in terms of its position and alignment.

The mounting arm can here further have a mounting projection, which preferably can extend at a right angle to the mounting arm. This mounting projection can be used in particular to achieve the positive connection, while allowing the supplemental pressing part to be relocatable along the marginal edges of the ribs that face each other. The mounting projection can be designed so as to be integral and possibly materially uniform with the mounting arm, wherein this mounting arm can further preferably be formed so as to be integral and possibly materially uniform with the supplemental pressing part.

In a preferred embodiment, the mounting projection interacts with the mounting surface of the pressing jaw to create a shiftable, positive mounting of the supplemental pressing part on the pressing jaw.

Before a pressing operation begins, the supplemental pressing part can be provided with a structure that serves to inscribe information on the marginal edge that forms part of the opening contour. For example, the supplemental pressing part can be used to imprint information into the pellet, whether in plain text or as a code, and further possibly in the form of geometric shapes as an alternative or in addition thereto, for example. Use can here be made of the fact that the surface of the supplemental pressing part does not dive under one of the ribs relative to the pellet during a pressing operation. The marginal edge of the supplemental pressing part forming part of the opening contour continues to act just as effectively on the pellet during the pressing operation. This characterization is important even independently of any use for having the supplemental part impart information.

With respect to the possible direct connection between the pressing jaws, one of the pressing jaws can otherwise have a penetration pin outside of the pressing opening, and the other pressing jaw can have an oblong hole. This oblong hole is preferably aligned in the entry direction of the pressing jaws. The penetration pin of the one pressing jaw is here preferably captured and guided in the oblong hole of the other pressing jaw. As a result of this arrangement, two end positions bordered by stops can arise with respect to the sliding displacement of the pressing jaws relative to each other, one insertion end position with the smallest possible pressing mouth opening surface, and one extension end position with the largest possible pressing mouth opening surface.

BRIEF DESCRIPTION OF THE DRAWINGS

A further disclosure and explanation is given below based on the attached drawing, but the latter only shows exemplary embodiments. A part that is only described in relation to one of the exemplary embodiments and is not replaced by a different part in an additional exemplary embodiment based upon the feature highlighted therein is hence described as an in any case possible present part for this additional exemplary embodiment as well. The drawing shows.

DESCRIPTION OF THE EMBODIMENTS

Figure 1:
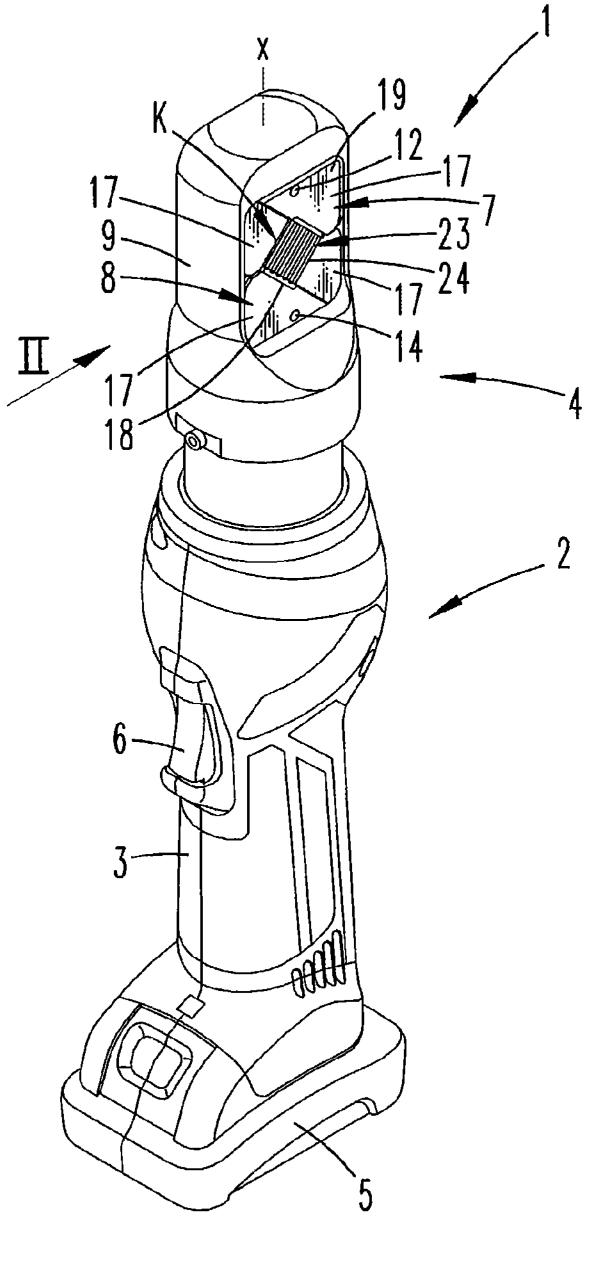
FIG. 1 a perspective view of pressing pliers, having pressing jaws according to the disclosure in a first embodiment.

Shown and described initially with regard to the view on FIG. 1 are preferably hydraulically activatable, in particular electro-hydraulically activatable, pressing pliers 1 in preferably a rod-like configuration.

The pressing pliers 1 initially and essentially have a drive unit part 2, which can simultaneously comprise a gripping area 3. For example, this type of drive unit part 2 is known from WO 2014/108361 A1 (U.S. Pat. No. 10,468,847 B2). The drive unit part 2 can alternatively also have an electromotive spindle drive, for example. For example, a spindle-operated drive unit part 2 is known from WO 2014/009363 A1 (U.S. Pat. No. 9,993,885 B2). The content of these WO publications or US publications is hereby included in the disclosure of the present disclosure in its entirety, also for the purpose of including features of these WO publications or US publications in claims of the present invention as well.

A working head 4 adjoins the drive unit part 2 toward a free end of the opening pliers 1. The working head 4 can be interchangeably mounted on the drive unit part 2, for example via a separation in the area of a preferably provided hydraulic cylinder. In addition, as also preferred, the working head 4 can be mounted so as to be freely rotatable around a working head longitudinal axis x relative to the drive unit part 2 or related to the drive part 2 and a related receptacle for the working head 4 in the drive unit part 2.

The arrangement of an accumulator 5 preferably provides the electrical power, in particular for an electric motor that drives a hydraulic medium pump or a spindle, but further also for a control unit (not shown) and additional electrical components in the pressing pliers 1.

The gripping area 3 can be designed for conventionally grasping the pressing pliers 1 with a user's hand. It is ergonomically beneficial to provide an activating key 6 allocated to the gripping area 3. The activating key 6 may be a depressible button that can be triggered by the user for causing a pressing.

Figure 4:
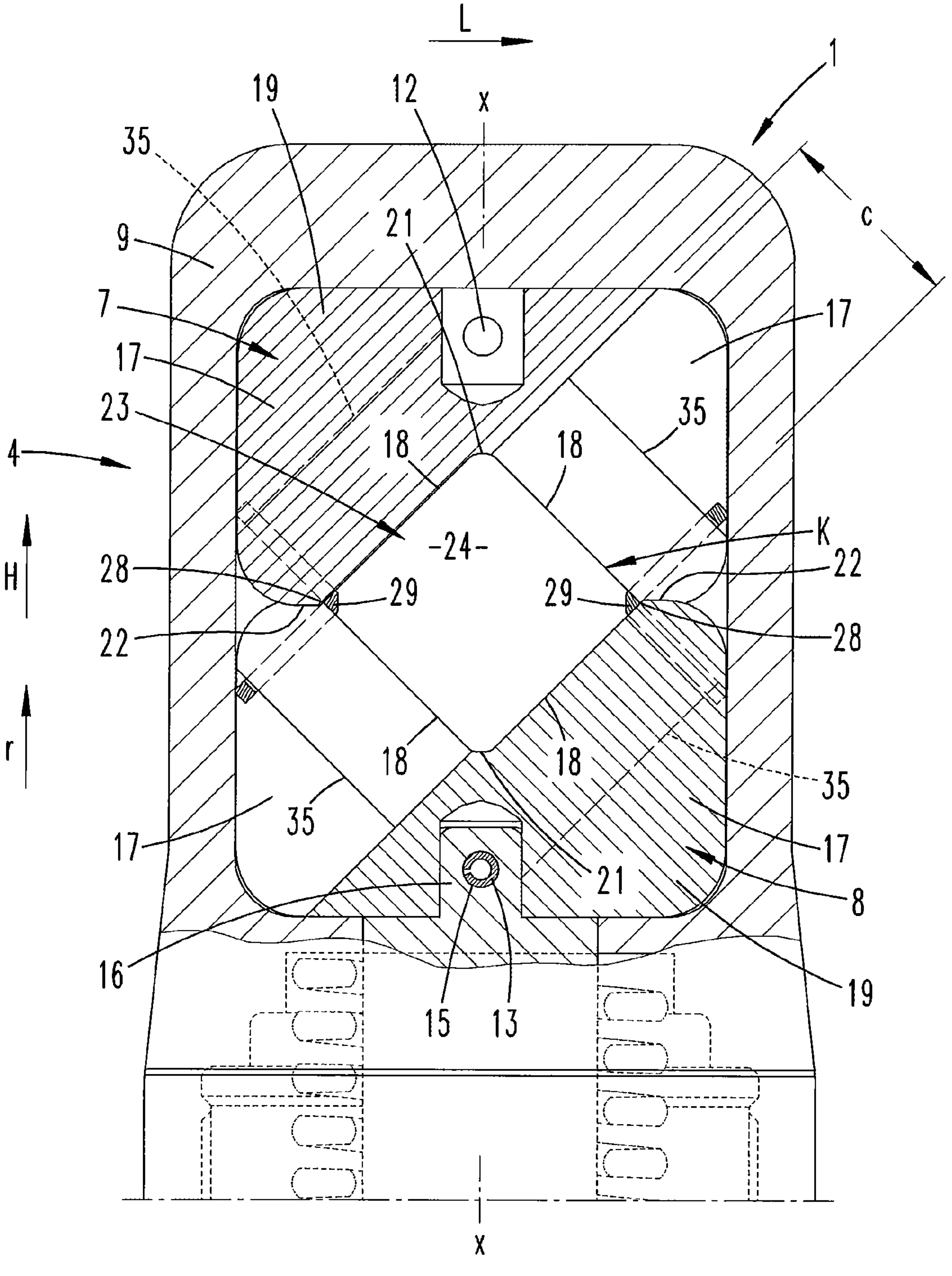
FIG. 4 the section according to line IV-IV on FIG. 2.
Figure 5:
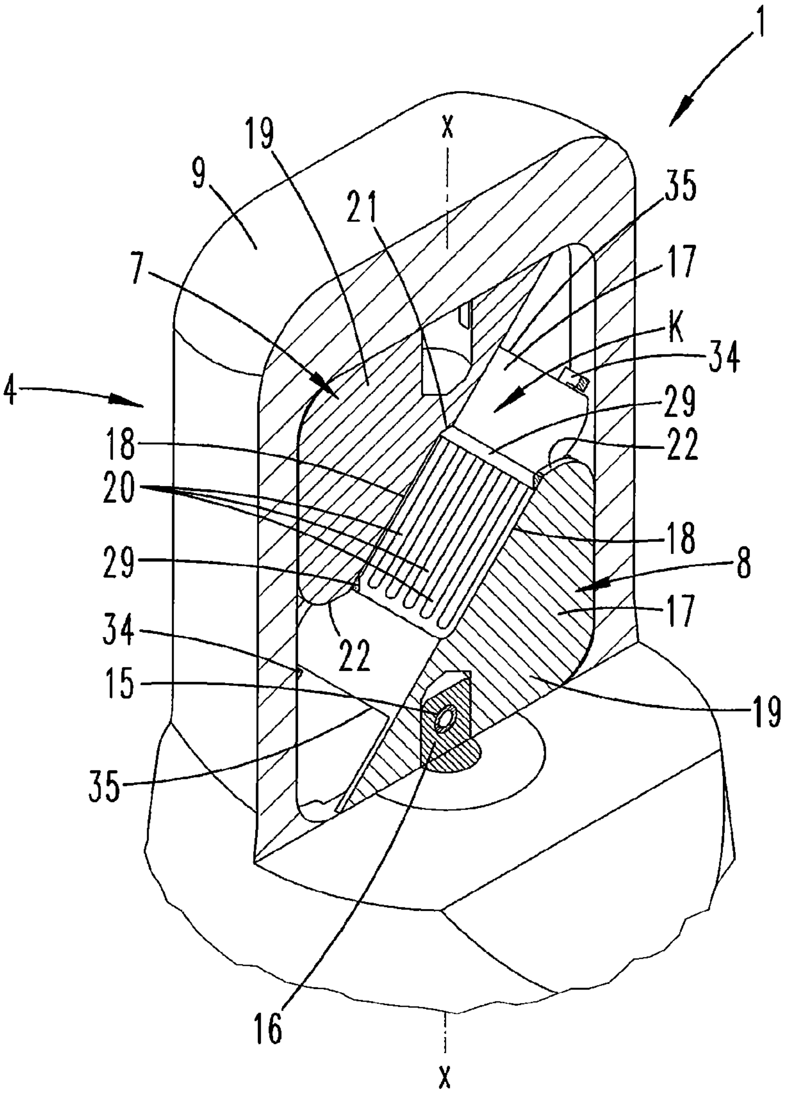
FIG. 5 a perspective view of the section according to FIG. 4.

Two pressing jaws 7 and 8 that face each other are arranged in the working head 4. One of the pressing jaws 7, 8 in the exemplary embodiment is here the pressing jaw 7, preferably immobilized as the fixed jaw in a mounting head 9 of the working head 4. By contrast, the other pressing jaw 8 can be moved toward the pressing jaw 7 in a traversing direction r, see FIG. 4, in the working head 4 along the longitudinal axis x. The pressing jaw 8 is movably guided for this purpose in the exemplary embodiment. Given a corresponding activation of the key 6, this movable pressing jaw 8 is shifted along the longitudinal axis x in the direction toward the fixed pressing jaw 7, directly or indirectly by a driven hydraulic piston or the spindle.

Figure 2:
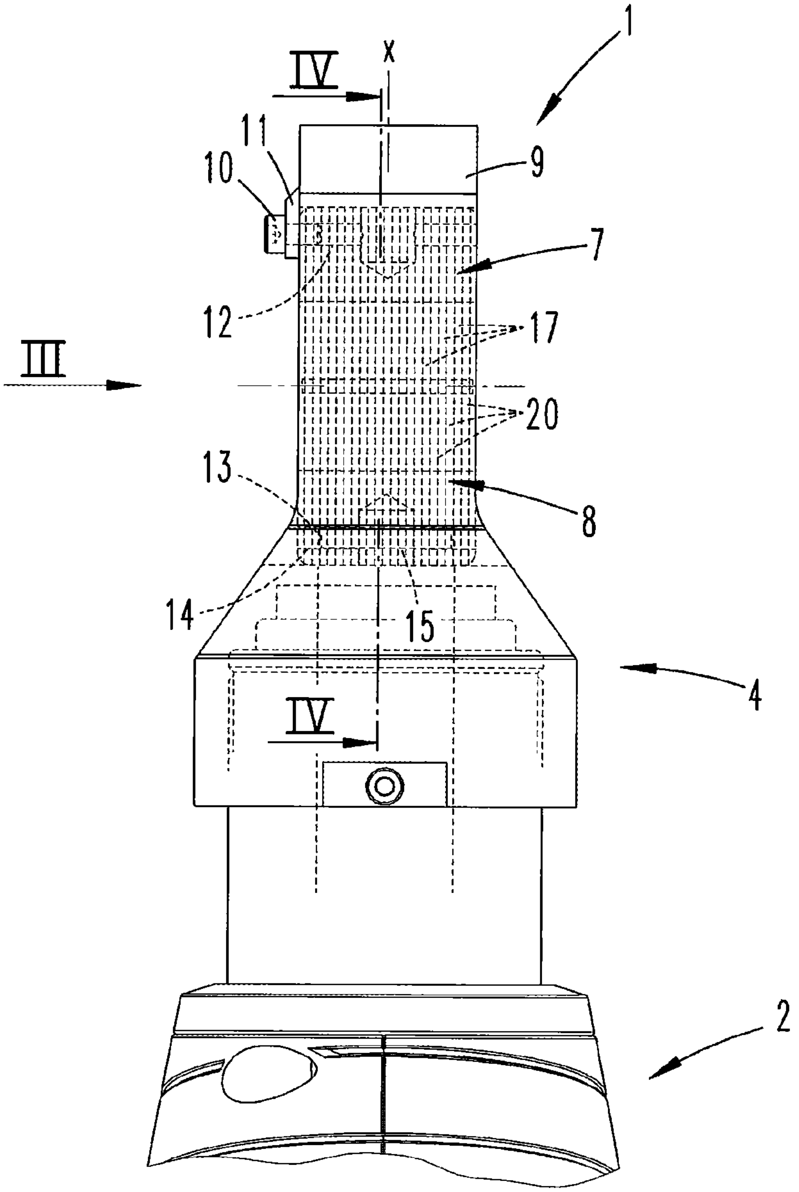
FIG. 2 a magnified side view of the area of the pressing pliers having the pressing jaws.

As also preferred, the fixed pressing jaw 7 can be positively secured to the mounting head 9. For example, a screw 10 can be used for this purpose, which is supported against a mounting bracket 11 of the mounting head 9, and engages into an allocated borehole 12 of the pressing jaw 7 (see FIGS. 2, 3 and 4).

The movable pressing jaw 8 can likewise be positively attached to the linearly relocatable element 16 (for example a hydraulic piston or spindle). For example, a pin-like clamping sleeve 13 can be provided for this purpose, which rests in a borehole 14 of the pressing jaw 8 aligned transverse to an entry direction r as well as a borehole-shaped receptacle 15 on the end side of the linearly relocatable element 16 of the drive unit part 2.

Figure 6:
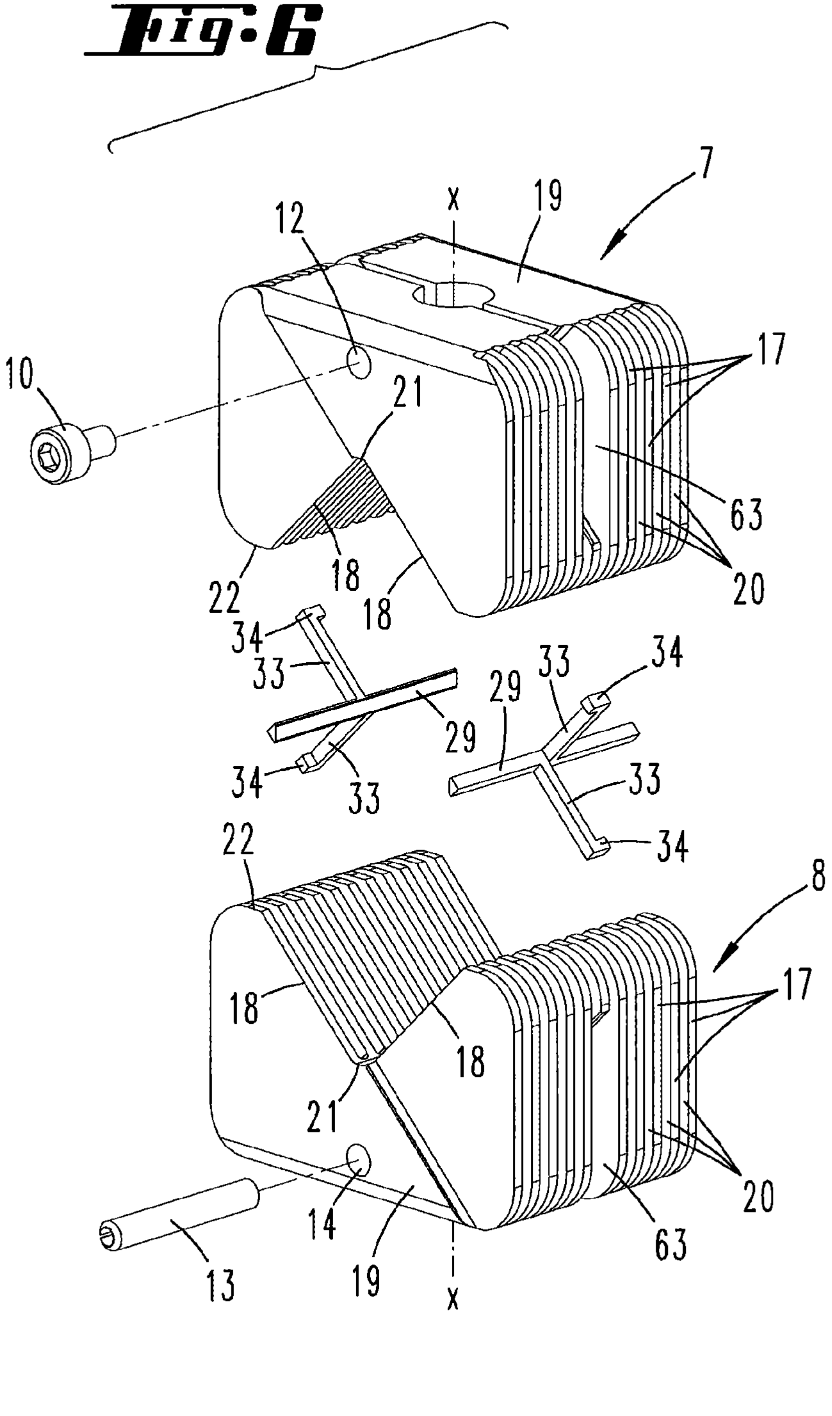
FIG. 6 perspective individual views of the pressing jaws with allocatable supplemental pressing parts.
Figure 9:
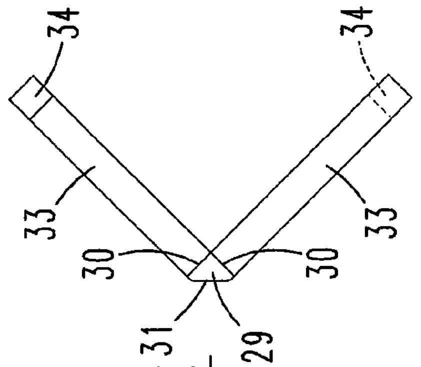
FIG. 9 the opposing side view against the supplemental pressing part according to arrow IX on FIG. 7.
Figure 7:
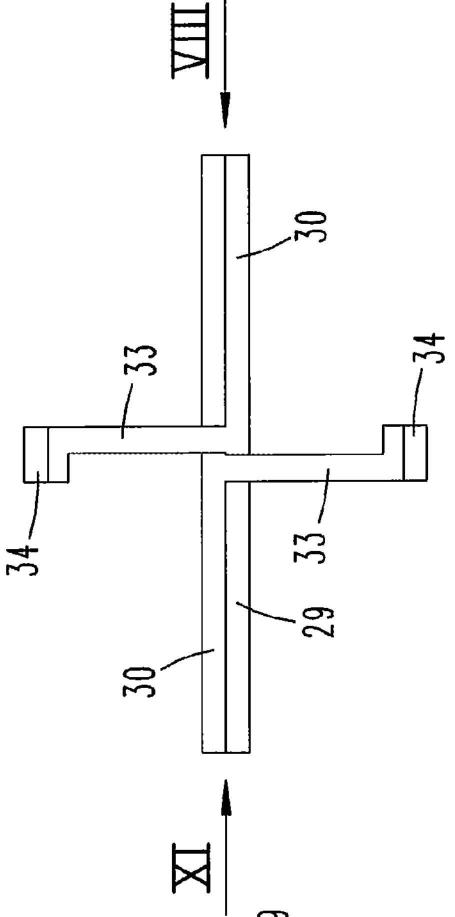
FIG. 7 an individual view of the supplemental pressing part.
Figure 8:
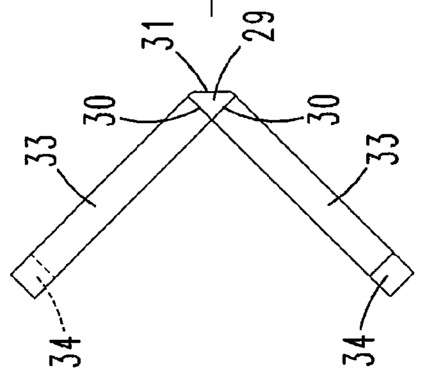
FIG. 8 the side view against the supplemental pressing part according to arrow VIII on FIG. 7.
Figure 10:
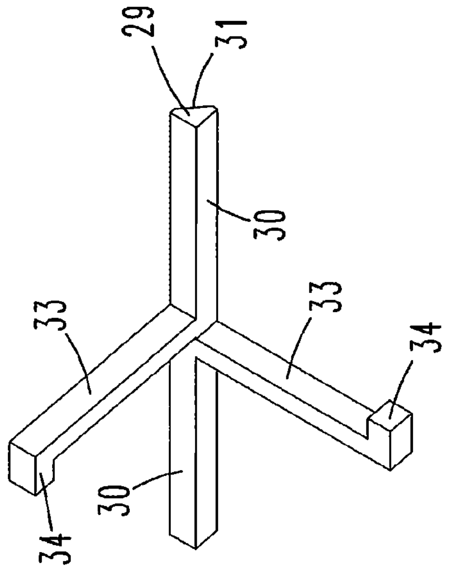
FIG. 10 a perspective, individual view of the supplemental pressing part.

As shown in FIG. 6, the area of the side walls aligned in the traversing direction r, the pressing jaw 8 can have a respective groove 63, for example for interactively guiding with a rib-like projection (not shown) in the mounting head 9. This can further provide an obstacle to the rotation of the movable pressing jaw 8. The first pressing jaw 7 may also have a groove 63, preferably opened outward in the area of the side walls thereof which are aligned in the traversing direction r for interactively guiding with a rib-like projection (not shown) in the mounting head 9.

In pressing pliers 1 according to the EP 3 179 580 A1 mentioned at the outset, the lever parts that can be pivoted toward each other and on whose ends the pressing jaws are arranged result in a relocation of these ends on a circular path with a comparatively large diameter. However, the interlocking pressing jaws even here practically move only in a linear traversing direction r to each other.

Figure 11:
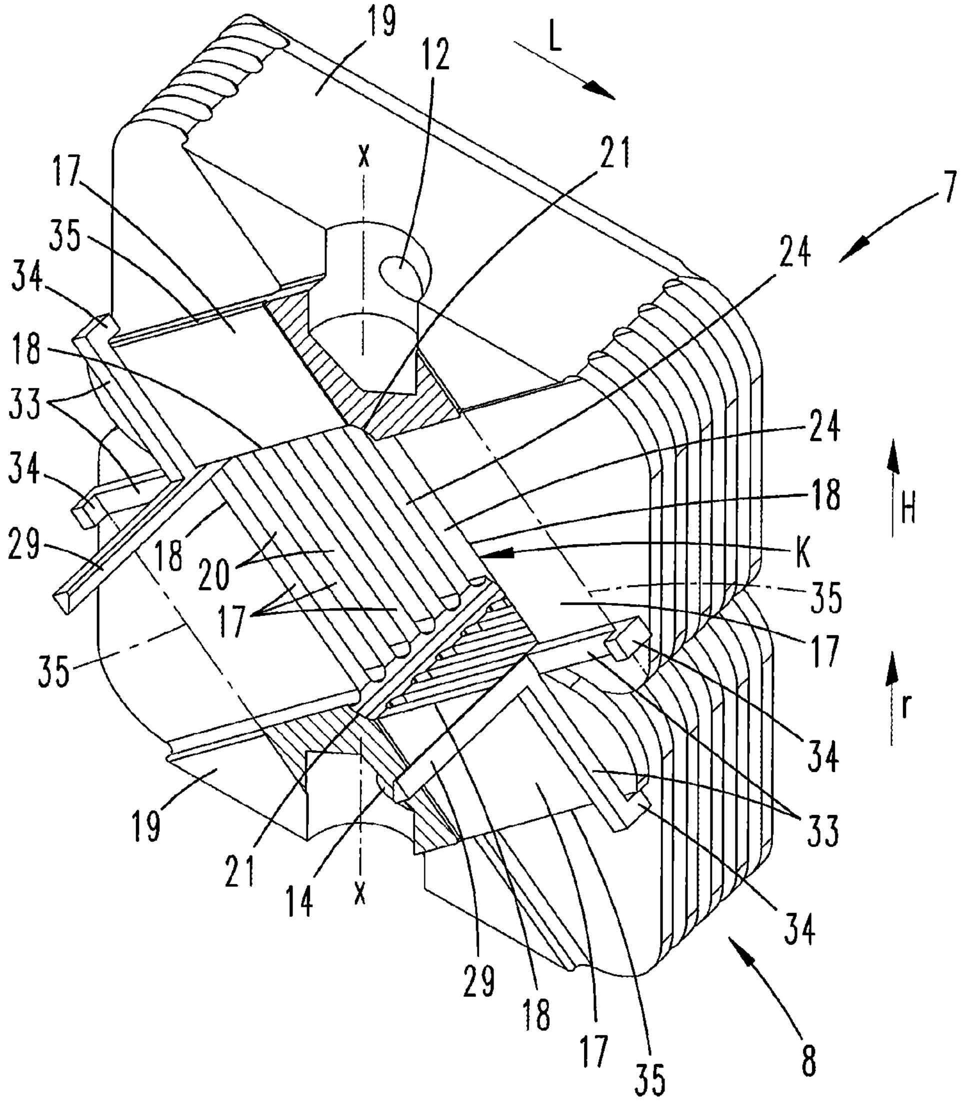
FIG. 11 a partially cut, perspective view of the pressing jaws with supplemental pressing parts.

Each pressing jaw 7, 8 has a first group of spaced apart ribs 17 fastened to a base 19 of each pressing jaw 7, or being one part therewith. Each rib 17 has a longitudinal extension L, see FIG. 11, viewed transverse to the traversing direction r or transverse to the longitudinal axis x, and a height extension H, see FIG. 11, viewed in the traversing direction r or parallel to the longitudinal axis x.

Figure 3:
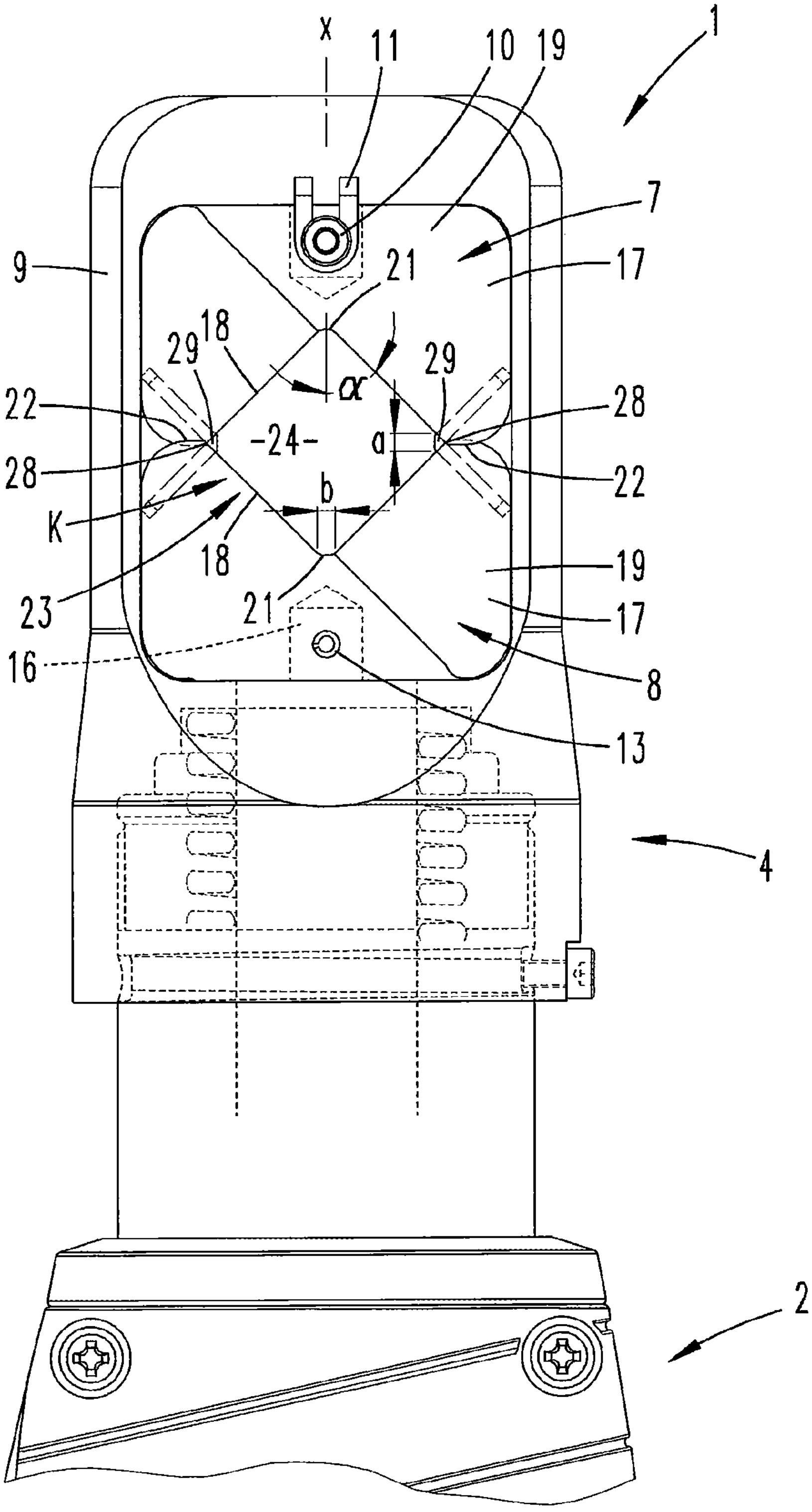
FIG. 3 the view against the area of the pressing device according to arrow III on FIG. 2.

Each rib 17 has a generally triangular shape, preferably in a direction perpendicular to the longitudinal extension L, for example according to the view of FIG. 3. The generally triangular shape, for example according to the view of FIG. 3, is defined by catheti that run in the longitudinal extension L and in the height extension H, and a hypotenuse that is inwardly directed relative to the mounting head 9, and provided by a marginal edge 18.

The marginal edges 18 of the ribs 17 define an angle $\alpha$ relative to the longitudinal axis x. The angle $\alpha$ is preferably 45 degrees, but angle $\alpha$ can be between about 30 and about 60 degrees, for example, and further can be about 40 to about 50 degrees, for example.

The ribs 17 can be fastened to the base 19 of each pressing jaw 7, 8, for example as the result of a one-piece and materially uniform design. The cathetus of the generally triangular rib 17 that runs in the height extension H is preferably positioned on an outer margin line of each pressing jaw 7, 8 or makes up for the marginal line. Proceeding from this outer margin line or cathetus, the marginal edge 18 drops off in the direction toward the free end of the other cathetus or in the direction toward the base 19.

The first group of ribs 17 on each pressing jaw 7, 8 is arranged generally congruently one after the other in a direction perpendicular to the longitudinal extension L. The ribs 17 are spaced apart from each other in this direction perpendicular to the longitudinal extension L. The related distance in the direction described above can essentially correspond to the thickness of a rib 17 as viewed in the same direction. Entry openings 20 for ribs 17 of the opposing pressing jaw correspondingly arise between two ribs 17 in the group.

With respect to a side view in which the generally and essentially triangular shape of the ribs 17 arises, for example as shown in FIG. 3, the first group of ribs 17 is mirrored onto the longitudinal axis x such that a second group of ribs 17 are provided. When viewed in a direction perpendicular to the longitudinal extension L, this second group of ribs 17 is offset by the thickness measure of a rib 17 relative to the first group of ribs 17 of the same pressing jaw. Accordingly, this yields a gap between an arrangement of ribs 17 of the first group and the arrangement of ribs 17 of the second group of the same pressing jaw.

The marginal edges 18 of the ribs 17 of the first and second groups of a pressing jaw define a right angle therebetween. This with a projection perpendicular to the longitudinal extension L.

A corner area 21 is defined by the marginal edges 18 of both the first and second groups of the pressing jaw 7. The corner area 21 is generally and essentially lying on the longitudinal axis x. The corner area 21 and the mirrored corner area 21 respectively may be traversed by the longitudinal axis x. The corner areas 21 may be rounded or, as also depicted, provided with a chamfer (for example, see FIG. 3). This can be accomplished by a respective configuration of the marginal edges 18.

In an initial position of the pressing pliers 1 according to FIG. 3, the movable pressing jaw 8 is relocated into a position that is preferably bordered by a stop. As also shown in the initial position of the pressing pliers 1 according to FIG. 3 and with the respect to the prescribed projection, facing end faces 22 of both pressing jaws 7 and 8 can possibly extend in a shared plane aligned transverse to the longitudinal axis x. In this initial position, the one pressing jaw can also partially dive into the other pressing jaw like a comb, wherein the ribs 17 of one pressing jaw engage into the entry openings 20 of the other pressing jaw.

A pressing mouth 23 with a pressing opening 24 is formed between the pressing jaws 7 and 8. The pressing opening 24 extends in a depth direction, therefore e.g. perpendicular to the longitudinal extension L. The marginal edges 18 of the ribs 17 of both pressing jaws 7 and 8 here define an opening contour K of the pressing opening 24, wherein in the exemplary embodiment shown, with respect to a view according to FIG. 3, said opening contour K, as also preferred, has a generally square shape, possibly with chamfered corner areas 21, as well as, as described further below, corner areas covered in patches between ribs 17 of the pressing jaws 7 and 8 that slide by each other in a comb-like manner during a pressing operation. The opening contour K borders an opening surface.

Figure 13:
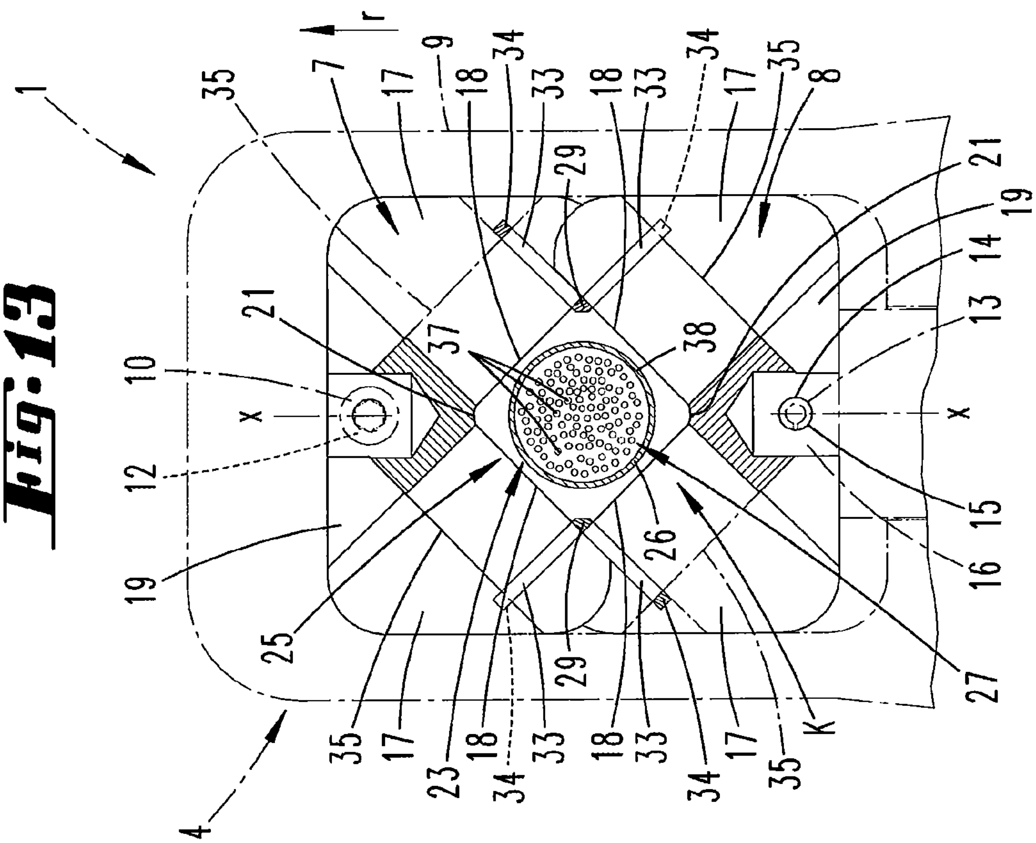
FIG. 13 a view corresponding to FIG. 12, but relating to an intermediate position during a pressing operation.

For example and as also preferred, the pressing pliers 1 are used for pressing pellets 25, further preferably in the form of a wire end ferrule 26, which is put over the insulated end of a cable 27. In order to press the wire end ferrule 26 with the cable end, the pellet 25 is guided into the pressing mouth 23, such that a longitudinal extension of the pellet 25, here the wire end ferrule 26, is essentially aligned perpendicular to the longitudinal extension L of the ribs 17 in the projection direction described above (see FIGS. 12 to 14).

Based on a preferably hydraulic or electro-mechanical relocation of a movable second pressing jaw 8 in the direction along the longitudinal axis x toward the fixed pressing jaw 7 results in a reduction of the area of the pressing opening 24 during a comb-like interlocking of the ribs 17 of both pressing jaws 7 and 8, while preferably retaining the basic geometry of the pressing opening 24 or the opening contour K, preferably while retaining the square opening contour K. With respect to the projection described above, the corner area 21 of the movable pressing jaw 8 moves along the longitudinal axis x in the direction toward the corner area 21 of the fixed pressing jaw 7 during the pressing operation.

A first intersection 28, in the said projection, is formed between the interlocking first groups of ribs 17 of the pressing jaws 7 and 8. The intersection 28 is with reference to the drawings, e.g. according to FIG. 3, to understand as the intersection of the first and second pressing jaw, given when extended to the outside. An imaginary straight-line connection of the first and second intersections 28 in or parallel to the opening surface runs transverse to the longitudinal axis x in each pressing position, i.e., in each traversing position of the movable pressing jaw 8. The intersections 28 further move toward each other along the longitudinal extension L of the ribs 17 during a pressing operation.

In these gusset areas of the ribs 17 that have the intersections 28, supplemental pressing parts 29 are used on the pellet 25 to improve the pressing geometry.

As also preferred, both provided supplemental pressing parts 29 can have the same design.

In an embodiment, which is also preferred, each supplemental pressing part 29 has a web-like design, and in a corresponding allocation position to the pressing jaws 7 and 8 extends over the area of a plurality of ribs 17 of both pressing jaws 7 and 8, further preferably over all ribs 17 of the groups of ribs 17 that comb with each other.

As also preferred, a generally triangular layout contour arises in a cross-section transverse to a longitudinal extension of the supplemental pressing part 29, with two surfaces 30 that preferably lie flat against the marginal edges 18 of the ribs 17 in the use state. The surfaces 30, in the use state, cover the intersections 28. The intersections 28 are viewed from the inside of the pressing openings 24 behind the respective supplemental pressing parts 29. Due to the mentioned alignment of the marginal edges 18, these surfaces 30 preferably run according to the legs of a triangle, further preferably including an angle of about 90 degrees relative to each other. As depicted, the surface 31 that connects surfaces 30 and in the use state faces in the directly toward the interior of the pressing opening 24 can be formed like a straight line in cross-section, thereby yielding a triangular cross-section, further preferably a right triangle, in which the surface 31 is essentially directed in the entry direction r.

The surface 31 is also referred to as a supplemented part of the opening contour K or of the margin line that borders the opening surface.

The surface 31 can alternatively also be defined in cross-section by a selected line that deviates from a straight line, for example by a uniform or even non-uniform arc line, or also by a combination of various lined-up line segments that taken together form the surface 31. For example, this can further result in a concave or even convex design for the surface 31.

Figure 27:
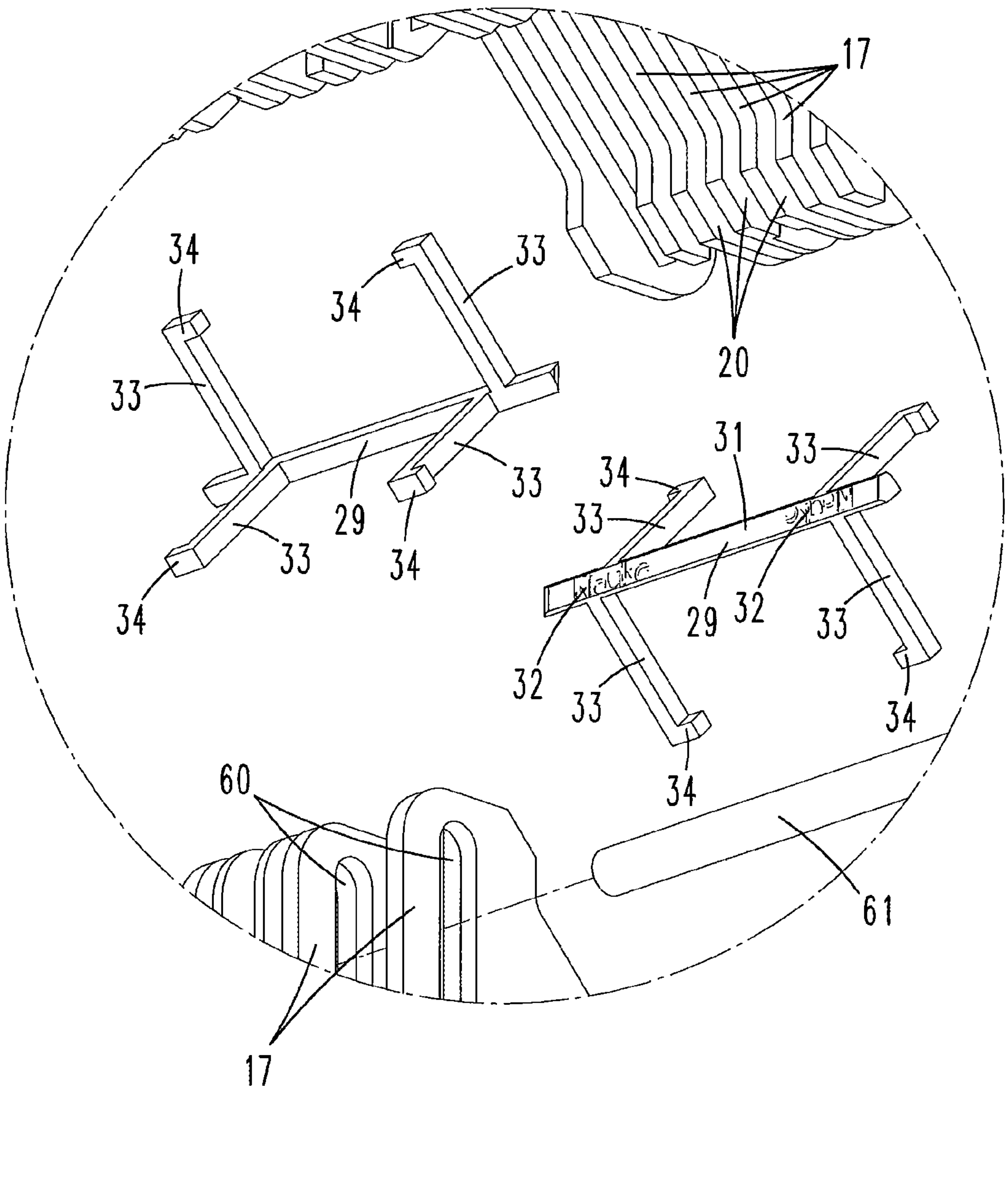
FIG. 27 the magnification of area XXVII on FIG. 26.
Figure 28:
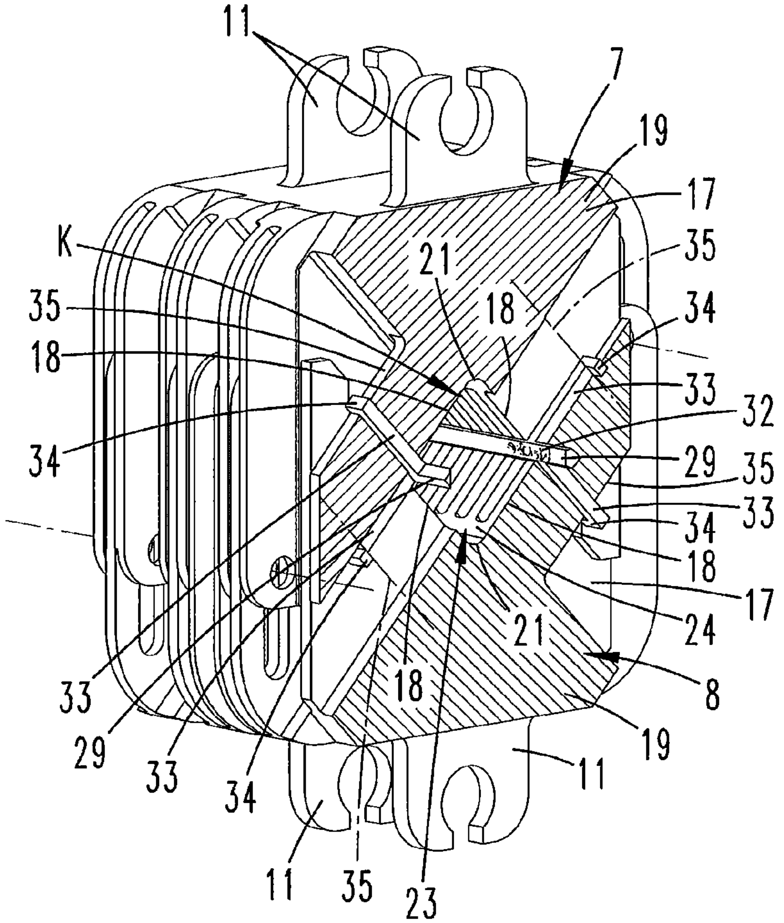
FIG. 28 a partially cut, perspective view of the pressing jaws with supplemental pressing parts.
Figure 29:
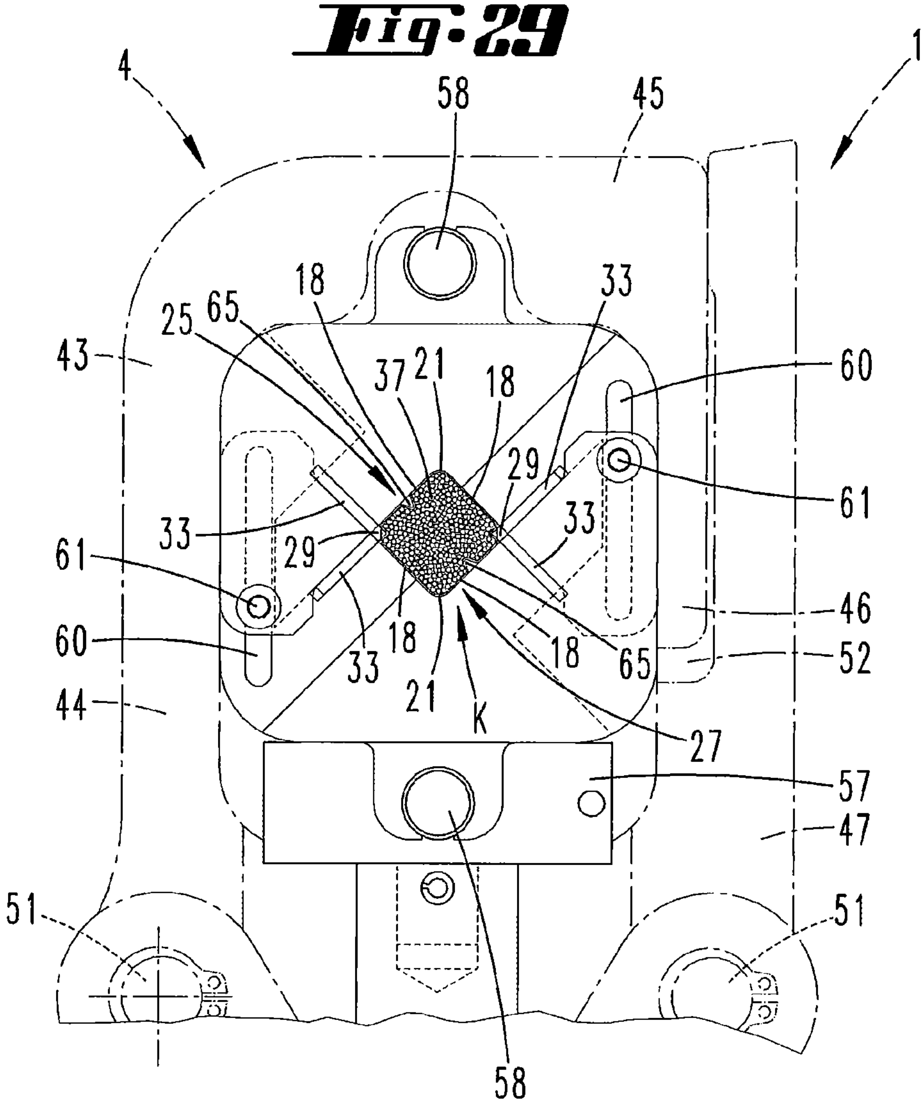
FIG. 29 a view corresponding to FIG. 14 after completion of a pressing operation, but relating to the third embodiment.
Figure 30:
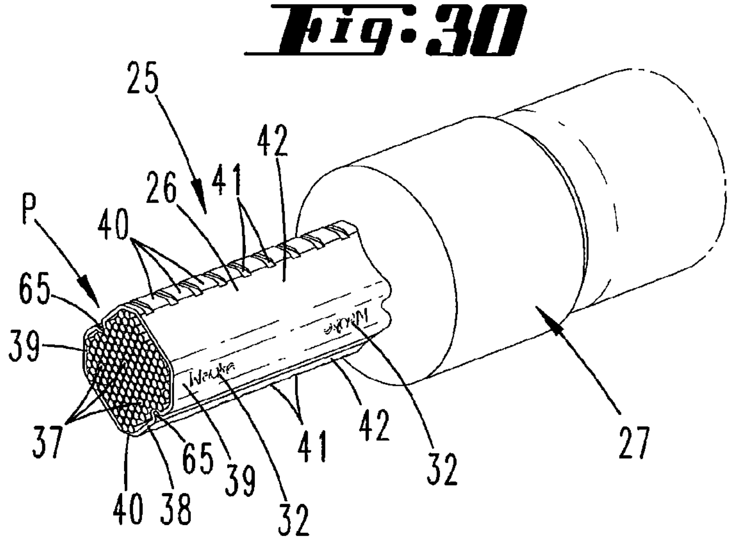
FIG. 30 a perspective view of a pellet formed while using the pressing jaws of the third embodiment.

A cross-sectionally non-uniform progression of the margin line that defines the surface 31 can also arise, for example due to an applied or inserted structure 32. For example, such a structure 32 is shown in FIG. 27 in relation to the second embodiment, and can be used inscribe information on the pellet 25, for example. Such a structure 32 can also be provided on only one of the two supplemental pressing parts 29.

Accordingly, the surface 31 can be uniformly or even non-uniformly designed over the length of the supplemental pressing part 29, the latter in the area of such a structure 32, for example, wherein a uniform, for example straight-line, progression of the surface 31 can possibly be provided in the areas in front and back of the structure 32.

In a possible embodiment, a first mounting arm 33 extends from one of the surfaces 30 and has a mounting projection 34. The mounting projection 34 may extend on the end side and may further extend at a right angle to the mounting arms 33. A second mounting arm 33 extends from the other of the surfaces 30 and has a mounting projection 34 also preferably on the end side that protrudes further preferably at a right angle thereto. The thereafter given two mounting projections 34 extend in opposite directions.

The supplemental pressing parts 29 are preferably positively attached to both pressing jaws 7 and 8, but both pressing jaws 7 and 8 but further preferably are movable relative to the groups of ribs 17. For this purpose, the mounting arms 33 engage between two ribs 17 of a group of a pressing jaw 7 or 8 and through the entry opening 20, and engage behind a mounting surface 35 of the rib 17 adjoining the entry opening 20 that preferably runs parallel to the marginal edge 18 (see FIG. 11). This correspondingly yields a parallel guidance of the supplemental pressing part 29, with the allocated intersection 28 always being covered or overlapped between the interlocking ribs 17.

Just as with the intersections 28, the opposing supplemental pressing parts 29 are continuously moved toward each other during the pressing operation into the interior of the pressing opening 24 along an imaginary line that runs transverse to the longitudinal axis x, with the surface 31 facing the interior of the pressing opening 20 always remaining constant. In a preferably straight-line design, the latter is further preferably always aligned parallel to the longitudinal axis x. During the pressing operation, the surfaces 30 of the supplemental pressing parts 29 further slide along the marginal edges 18 of the ribs 17 (see FIGS. 12 to 14).

Figure 20:
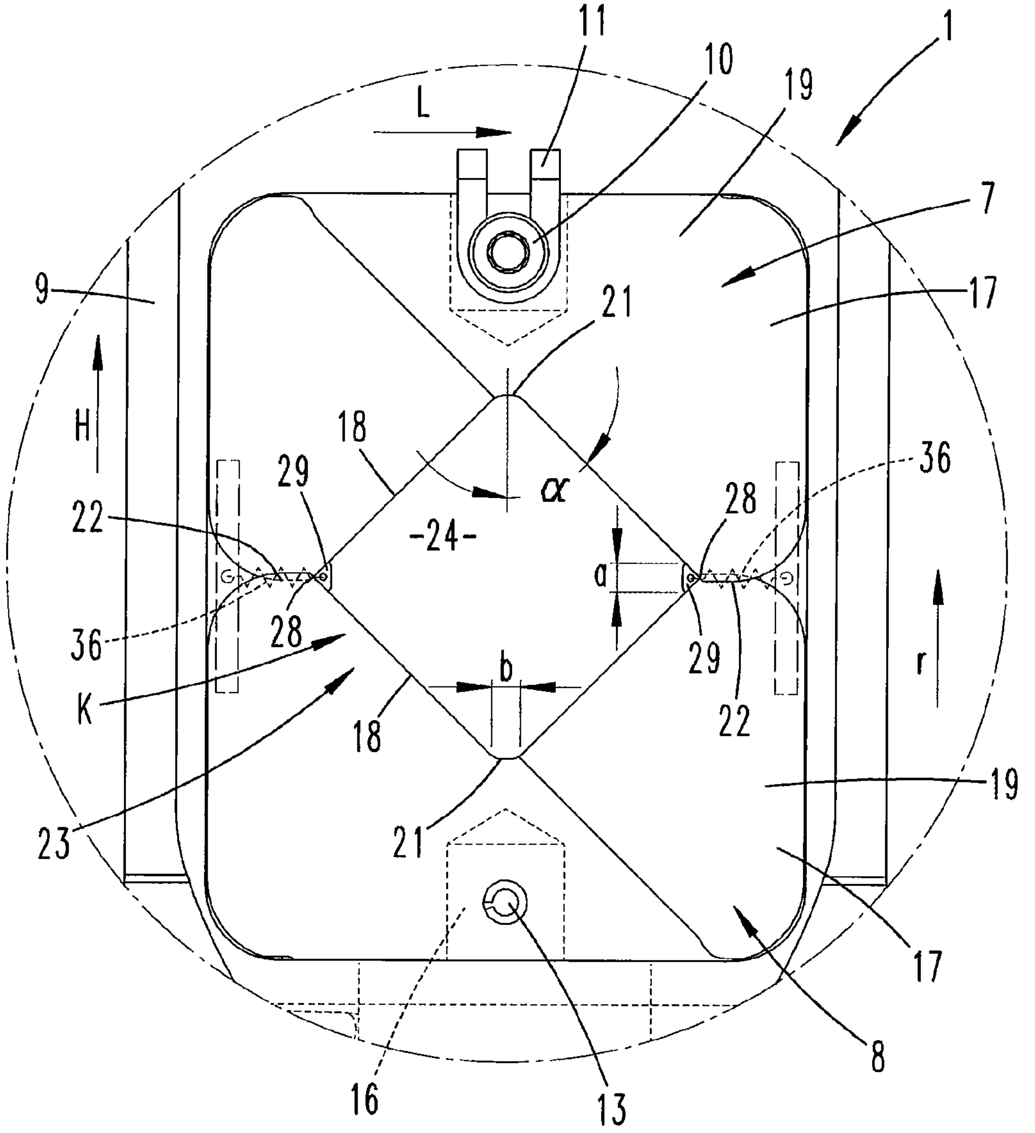
FIG. 20 a view essentially corresponding to FIG. 3, relating to a second embodiment.
Figure 21:
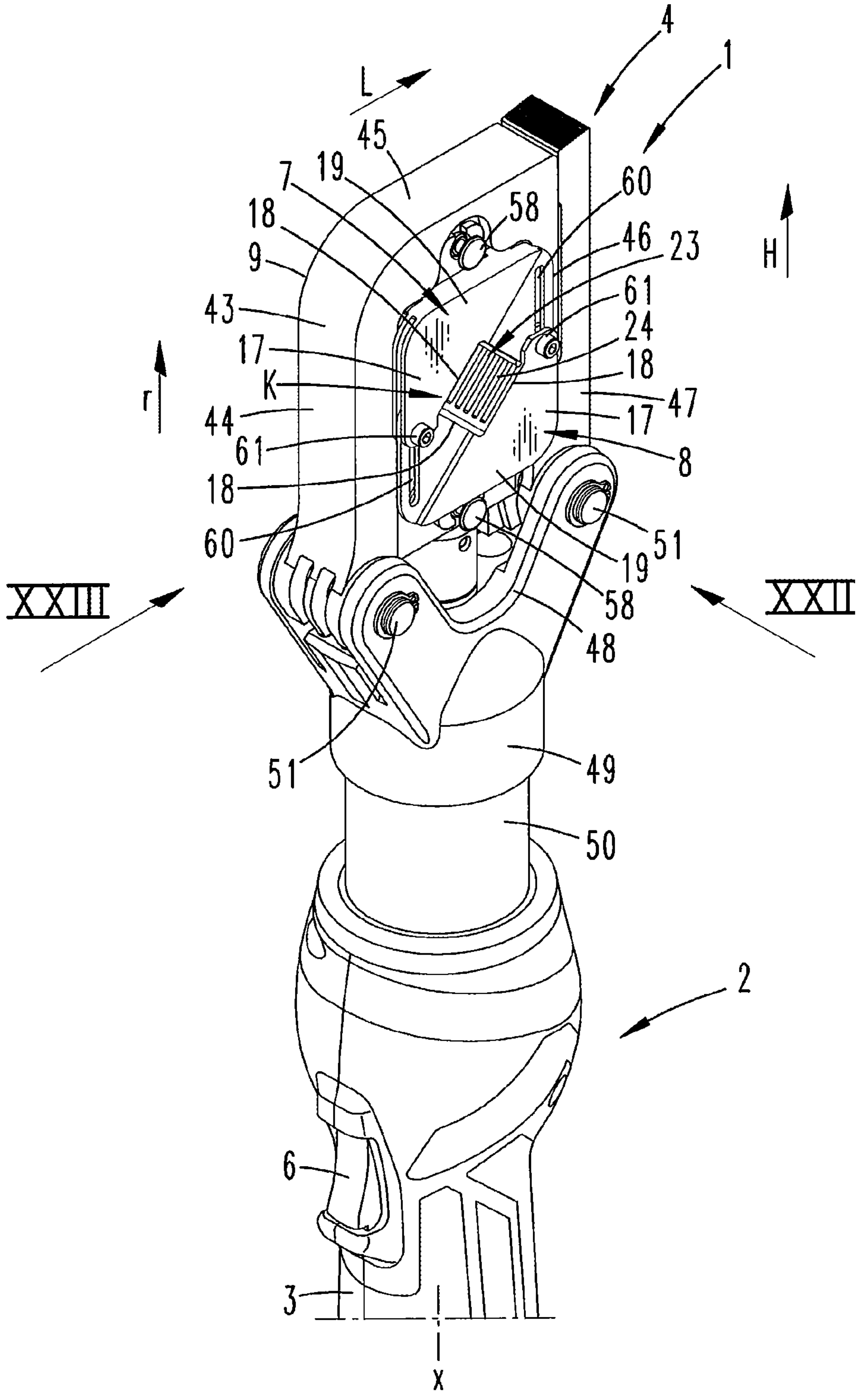
FIG. 21 a perspective view of pressing pliers with pressing jaws here described in a third embodiment.
Figure 22:
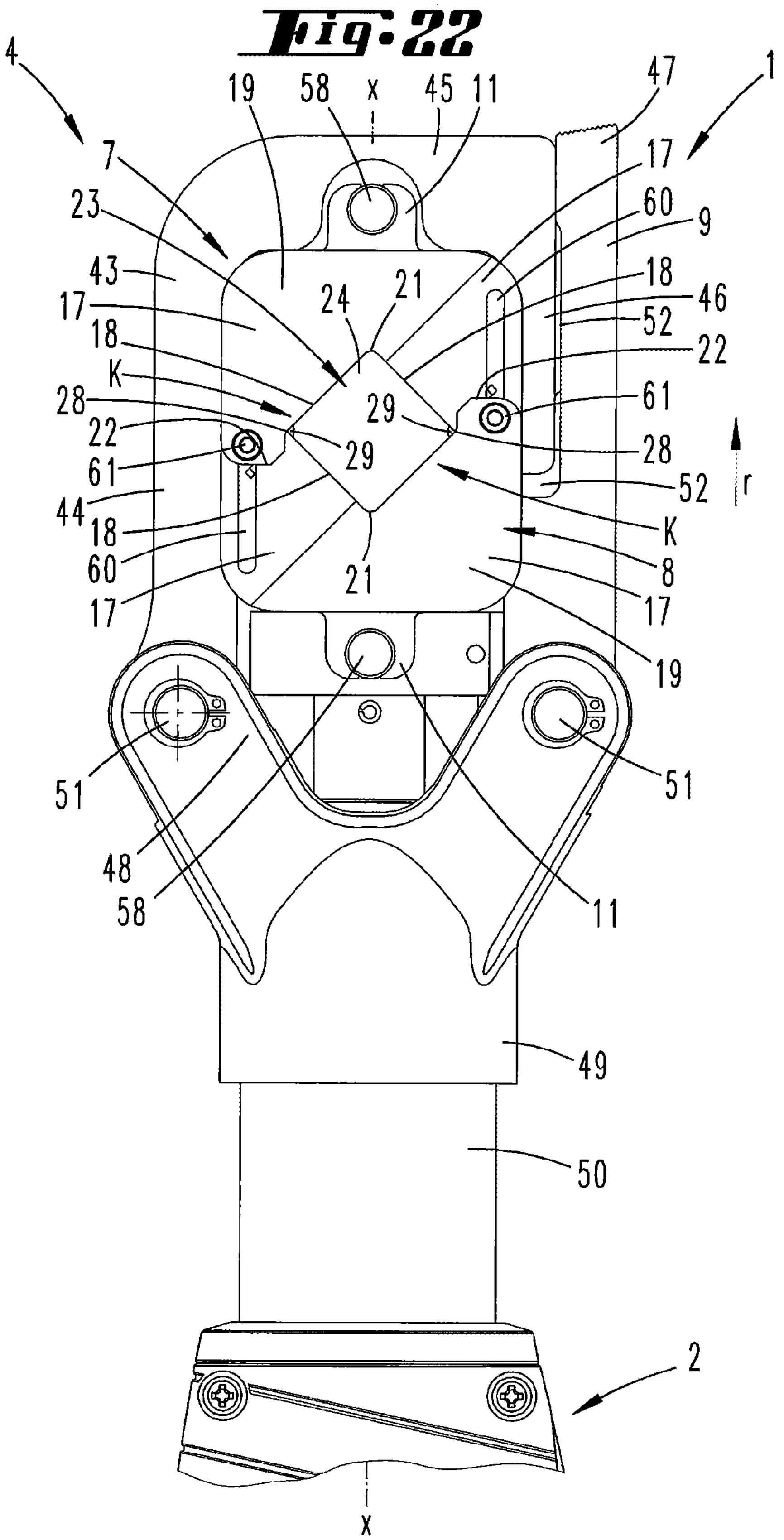
FIG. 22 the view against the pressing pliers according to arrow XXII on FIG. 21.
Figure 23:
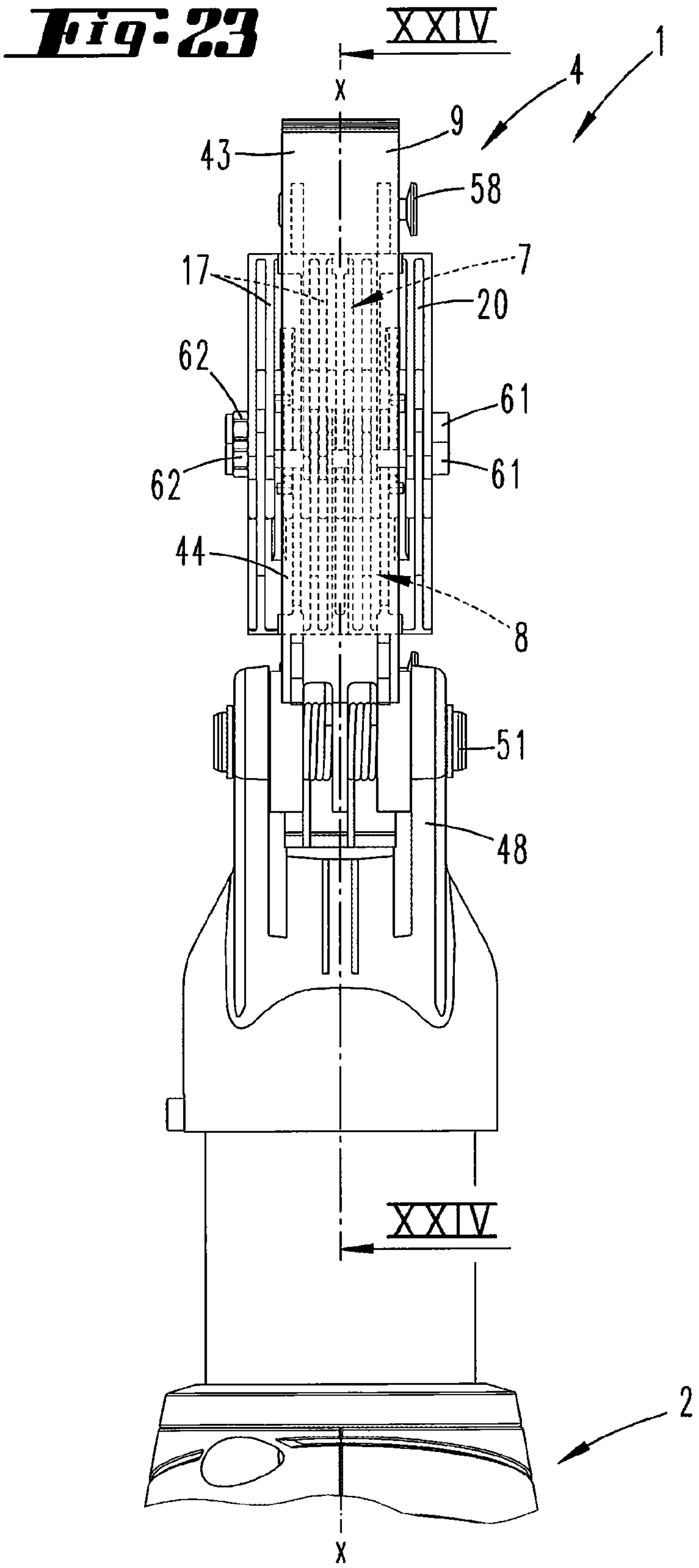
FIG. 23 the side view against the pressing jaws according to arrow XXIII on FIG. 21.

In a further embodiment as shown in FIG. 20, the supplemental pressing parts 29 are attached to the pressing jaws 7 and 8 e.g. by spring elements 36, for example in the form of cylinder tension springs. The mounting arms 33 can be replaced thereby. The supplemental pressing part 29 is constantly loaded in the direction toward the intersection 28 by the spring elements 36, but during the pressing operation can overcome the spring force along the marginal edges 18, and move transverse to the longitudinal axis x in the direction toward the opposing supplemental pressing part 29.

In a figurative sense, the arrangement of the supplemental pressing part 29 transforms the intersection 28 into a plurality of contacting points 64 (see also FIG. 15), or into a supplemented part of the margin line K.

According to the depicted exemplary embodiment, the length a of the surface 31 in cross-section, (see i.e. FIG. 3), essentially the length a between the free ends of the surfaces 30 in the direction of the longitudinal axis x, can correspond to about the length b of the chamfered corner area 21 as viewed transversely thereto, and thus further to about 0.5 to 2 times this length b, for example. The length a of the surface 31 can also be about equal to or correspond to 0.5 to 2 times the length c of a marginal edge 18 given a smallest possible pressing opening 24, up to 0.05 to 0.3 times the length c given a largest possible pressing opening 24, like the one shown exemplarily on FIG. 3.

Figure 12:
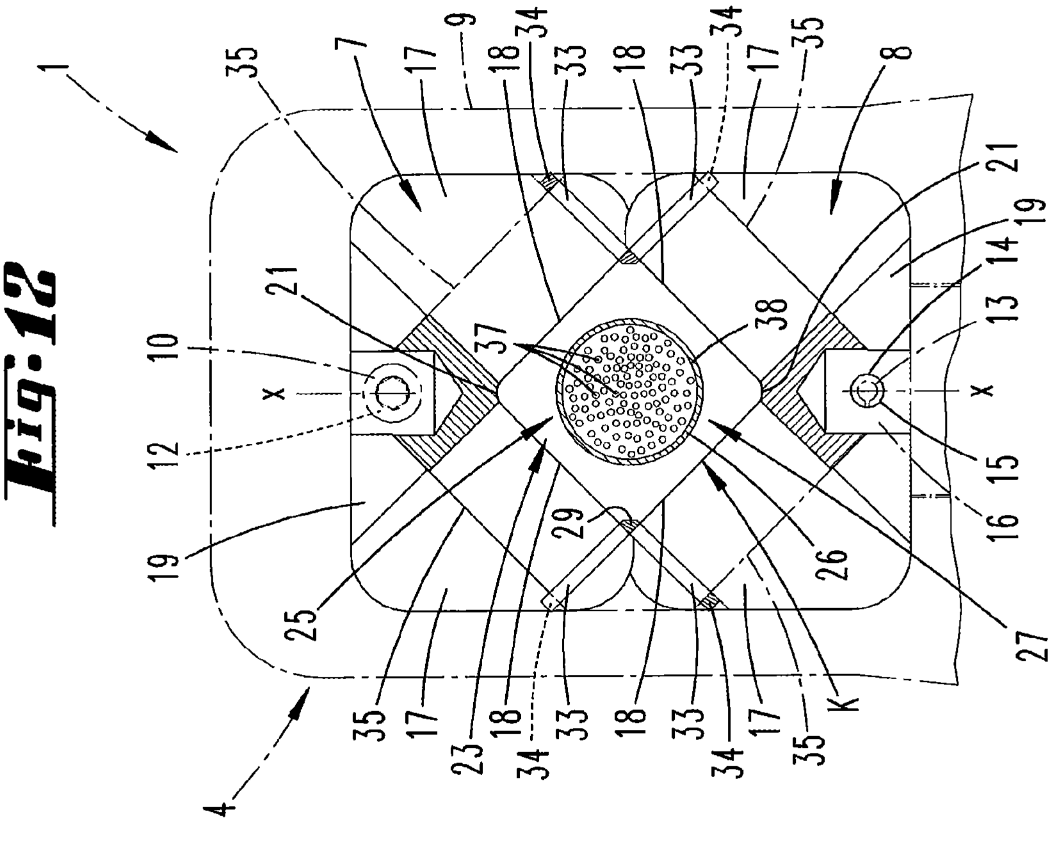
FIG. 12 the pressing jaws in a view according to FIG. 3, with a pellet inserted in a pressing mouth formed by the pressing jaws.

In order press a wire end ferrule 26 onto the insulated end of a cable 27, in particular while enclosing free wires 37 of the cable 27, via a wall 38 of the wire end ferrule 26 that is preferably circularly cylindrical in the uninfluenced state, the wire end ferrule 26 (pellet 25) attached onto the cable 27 on the end side is introduced into the pressing mouth 23 between the pressing jaws 7 and 8 (see FIG. 12). The activation of the pressing pliers 1 and accompanying linear displacement of the movable pressing jaw 8 relative to the fixed pressing jaw 7 leads to a continuous reduction in the pressing opening 24 that is preferably uniform relative to the free edge lengths c of the marginal edges 18 of the ribs 17 (see FIG. 13), initially up to an intermediate position (not shown) in which the marginal edges 18 come to abut against the wall 38 of the pellet 25 or the wire end ferrule 26.

The walls 38 of the wire end ferrules 26 are here depicted with a thickness in part distinctly greater than as a rule is actually the case. This serves to improve recognizability.

Figure 14:
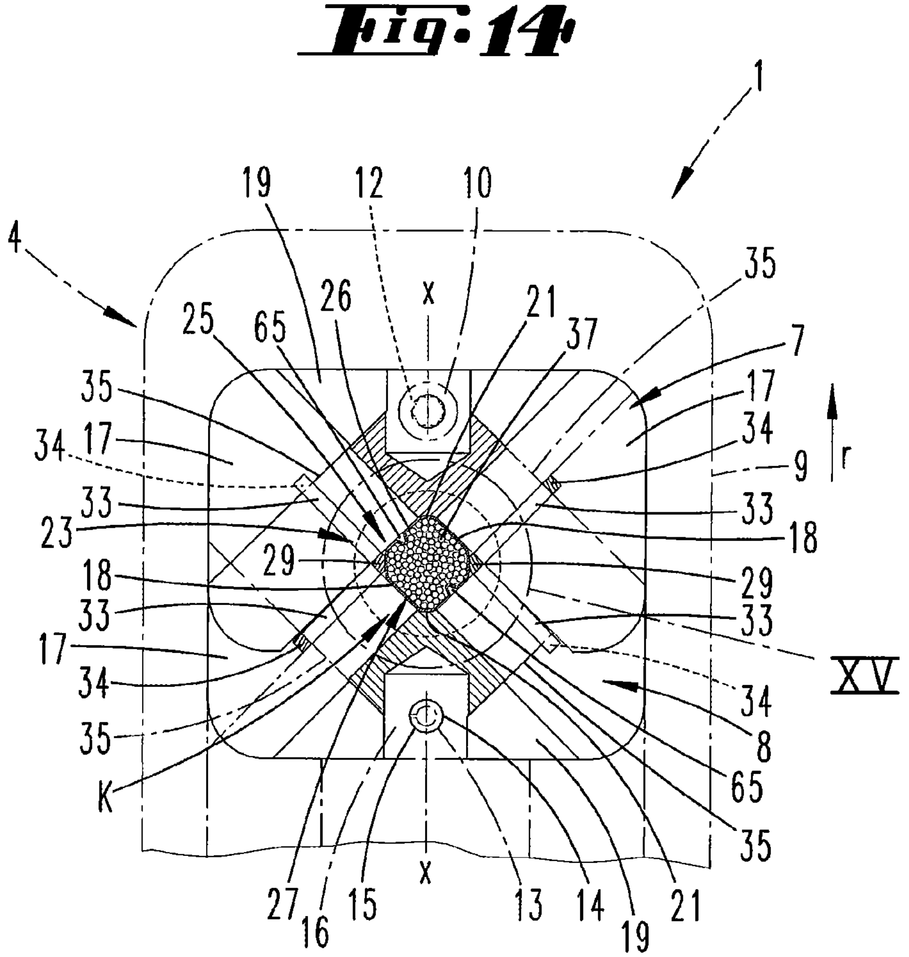
FIG. 14 another view corresponding to FIG. 12, but after completion of the pressing operation.
Figure 15:
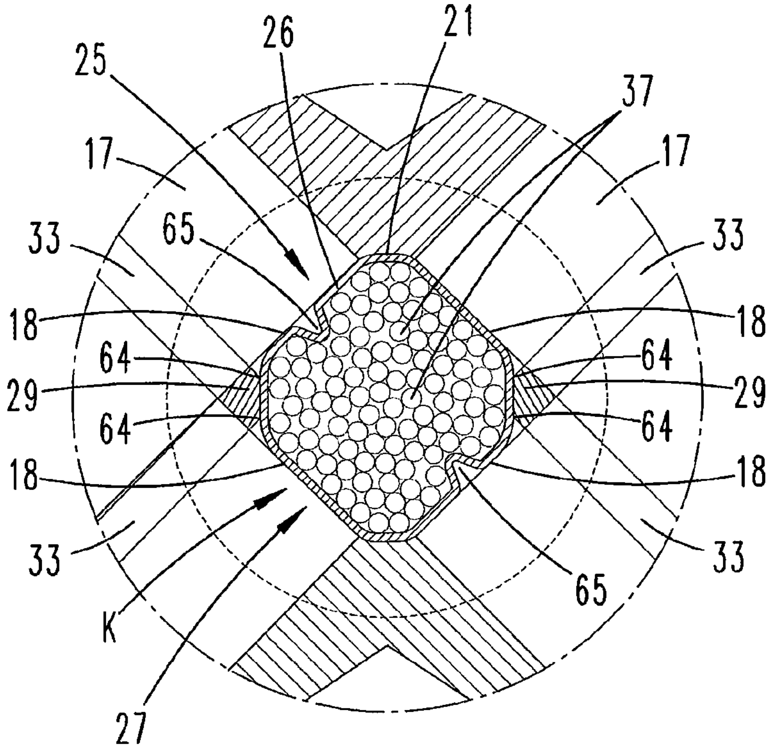
FIG. 15 the magnification of area XV on FIG. 14.
Figure 16:
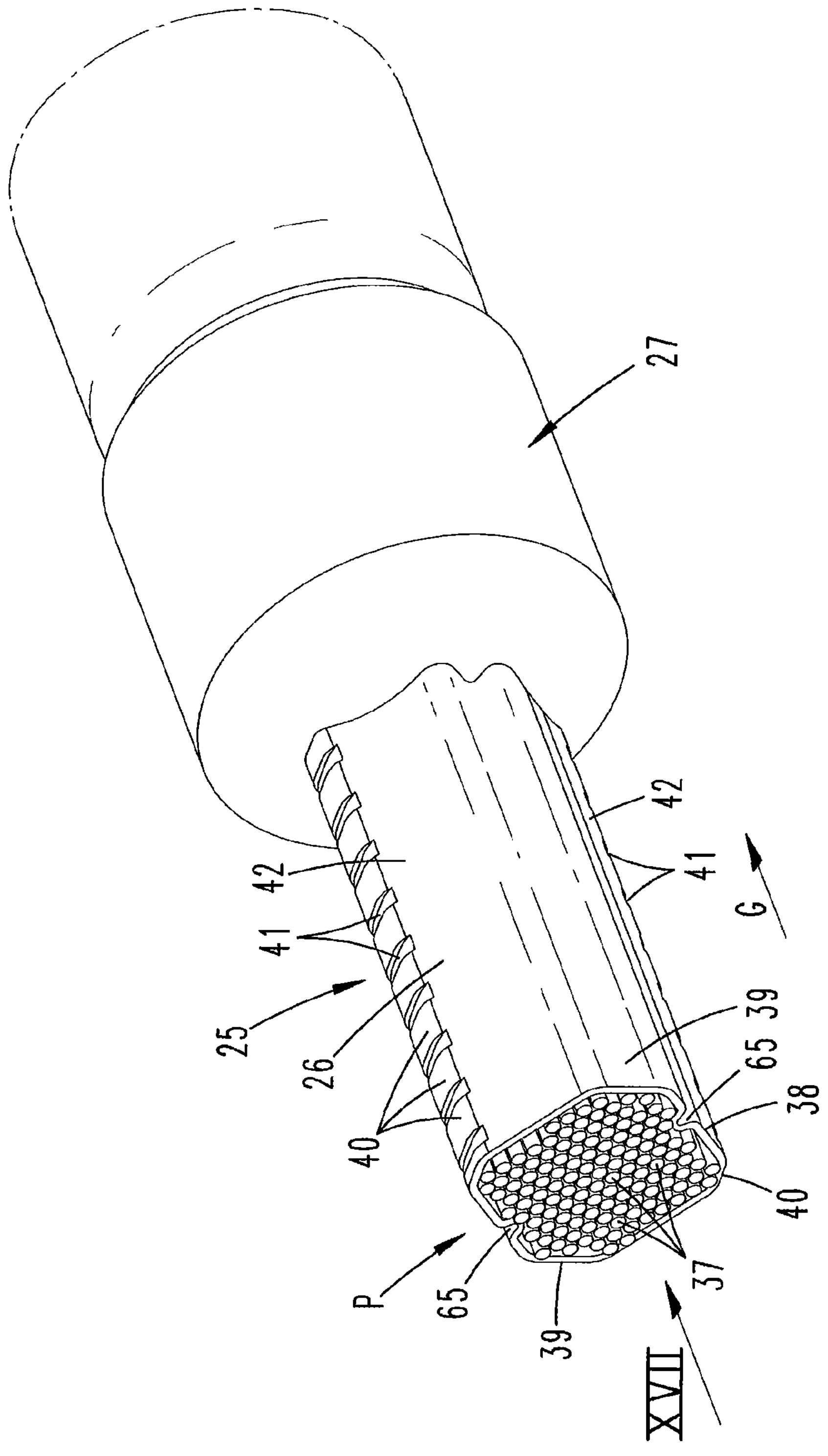
FIG. 16 a perspective view of a pellet formed while using the pressing jaws of the first embodiment.
Figure 17:
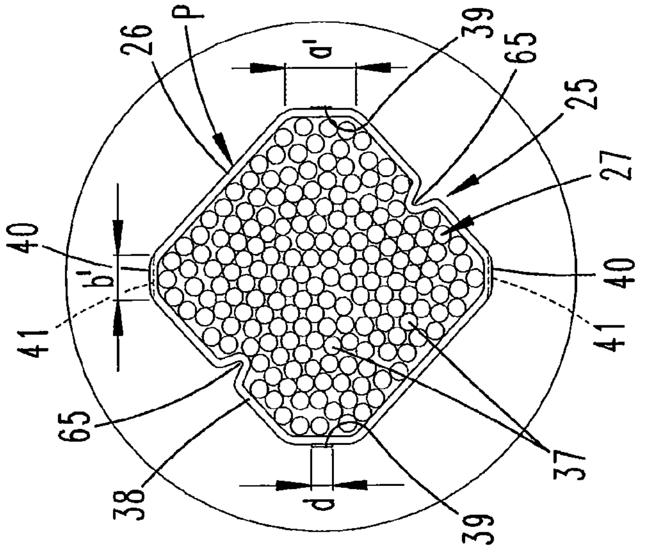
FIG. 17 the front view against the pellet according to arrow XVII on FIG. 16.
Figure 18:
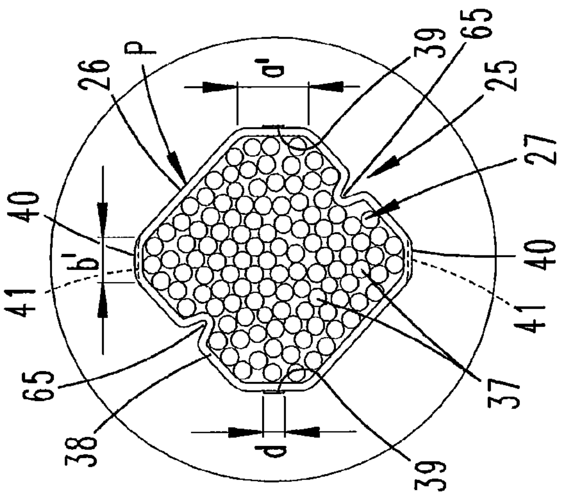
FIG. 18 a view corresponding to FIG. 17, but given a reduced cross section.
Figure 19:
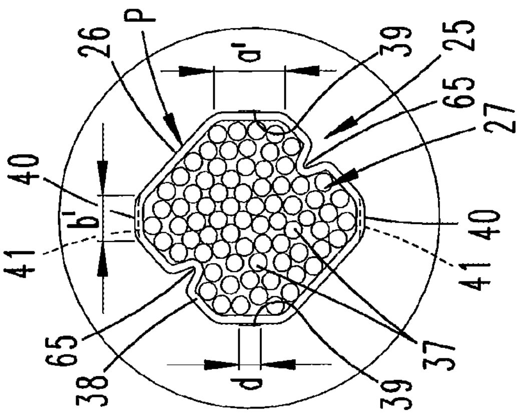
FIG. 19 another view according to FIG. 17, given a further reduction in cross section.

During the continued movement of the movable pressing jaw 8 against the fixed pressing jaw 7, the wall 38 of the pellet 25 is deformed according to the opening contour K (see FIGS. 14 and 15). The pressing contour P that thereby arises on the pellet 25 here essentially mirrors the opening contour K of the pressing opening 24 (see also illustrations on FIGS. 16 to 19).

The supplemental pressing parts 29 that during the pressing operation always overlap the intersections 28, and thereby the gusset area between the ribs 17 of both pressing jaws 7 and 8 that interlock like a comb, prevent wall material of the pellet 25 from being forced between the ribs 17 that slide by each other, in particular given pellets 25 or wire end ferrules 26 with a comparatively large diameter, as a result of which undesired burrs can form in these areas for a pellet 25. The intersections 28 are located outside of the opening contour K.

Such a bur formation is counteracted through the use of the supplemental pressing parts 29. Rather, fibrous surfaces 39 also arise in these corner areas of the pellet 25, and essentially are aligned transverse to the fibrous surfaces 40 that are formed by the correspondingly formed corner areas 21 of the ribs 17. A pressed cross-section of the pellet 25 further preferably arises, essentially in the form of an octagon.

In particular the gap arrangement of the ribs 17 of both groups of a pressing jaw allows notches 41 preferably spaced uniformly apart from each other to arise in the area of the surfaces 40 described above in the longitudinal direction G of the pellet 25, wherein said longitudinal direction G corresponds to the depth direction of the pressing jaws 7 and 8 perpendicular to the longitudinal extension L of the ribs 17 during the pressing operation. This continued deformation, in particular in the area of the surfaces 40, provides a safeguard that prevents the pressed pellet 25, here the wire end ferrule 26, from being removed from the wires 37.

As evident from the pellet illustrations on FIGS. 16 to 19, the extension dimensions a' and b' for the surfaces 39 and 40 remain identical in cross-section given identical pressing jaws 7, 8 and identical supplementary pressing parts 29, independently of the original and also pressed pellet cross-section. Only the free edge lengths of the inclined surfaces 42 that connect these surfaces 39 and 40 and are formed by the marginal edges 18 of the ribs 17 vary as a function of the pellet cross-section as a whole.

With regard to the pellets described herein given a pressing operation with pressing jaws, which have a supplemental pressing part 29 within the meaning described, but also independently hereof, in particular given generally rectangular and further in particular given generally square opening contours, it can advantageously be achieved that an inward fold 65 is provided on marginal edges 18 outside of corner areas 21 as well as outside of the intersections 28 or possibly outside of the supplemental pressing parts 29, see for example FIG. 15. This inward fold 65 proceeds toward the inside, and essentially has a V-shaped cross-sectional design. This makes it possible to achieve not only a better safeguard against the pressing sleeve or clamping sleeve 13 being torn out of the wires 37, but also a more advantageous electrical contacting. A height d denoting the inward penetration proceeding from the straight running surface of the opening contour can measure one twentieth to one or two tenths of a dimension between two opposing straight areas of the opening contour.

FIGS. 21 to 30 show another embodiment for pressing pliers 1 as well as adjusted pressing jaws 7 and 8. In particular the configuration and operating principle of the mounting head 9 in this embodiment is known from WO 1999/019947 A1 (U.S. Pat. No. 6,532,790 B2). The content of this WO publication or US publication is hereby also included in the disclosure of the present disclosure in its entirety, also for the purpose of including features of this WO publication or US application in claims of the present application.

The mounting head 9 in this embodiment essentially has a three-part design. One part is here designed as an angle part 43 that includes a long side, with a long side part 44, a narrow side part 45 extending at a right angle thereto, and a long side partial section 46 that runs parallel to the long side part 44, but extends only over about half of its length. As a consequence, the angle part 43 is U-shaped viewed from the side, with a longer leg—the long side part 44—and a shorter leg—the long side partial section 46.

The second part of the mounting head 9 which forms a rectangular guide includes a long side part 47 with a width measured transverse to the extension direction of the mounting head 9, i.e., transverse to a longitudinal axis x of the pressing jaw 1, which essentially corresponds to that of the angle part 43.

The third part of the mounting head 9 is designed as a second narrow side part 48, wherein two narrow side parts 48 spaced apart from each other are concretely provided in the exemplary embodiment shown. The latter are connected with each other via a flange 49 with a circular cross-section for arranging the mounting head 9 on a neck 50 of the drive unit part 2. Both the long side part 47 and the angle part 43 are pivotably mounted in the intermediate space formed between the narrow side parts 48.

For this purpose, both the narrow side parts 48 and an area of the long side part 47 and the free end of the longer U-leg of the angle part 43 are each penetrated by a bolt 51.

The long side part 47 of the mounting head 9 can be made to cover the long side partial section 46 of the angle part 43, for which purpose the latter has a thickness that can correspond to about half the thickness of the long side part 47 in the hinge area. The bottom side of the latter has a recess 52 open to the edge, allocated to the long side partial section 46.

Figure 24:
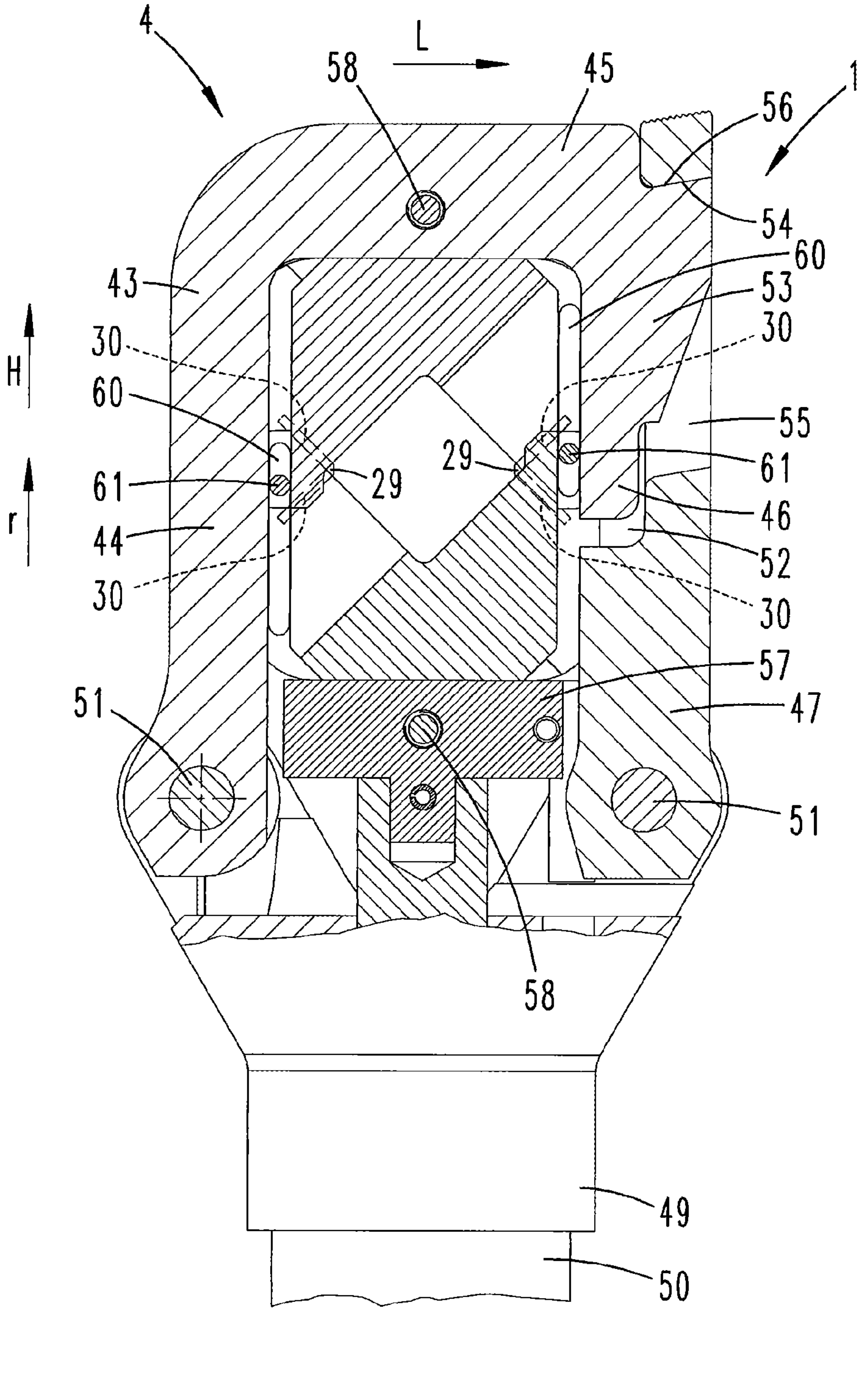
FIG. 24 the section according to line XXIV-XXIV on FIG. 23.
Figure 26:
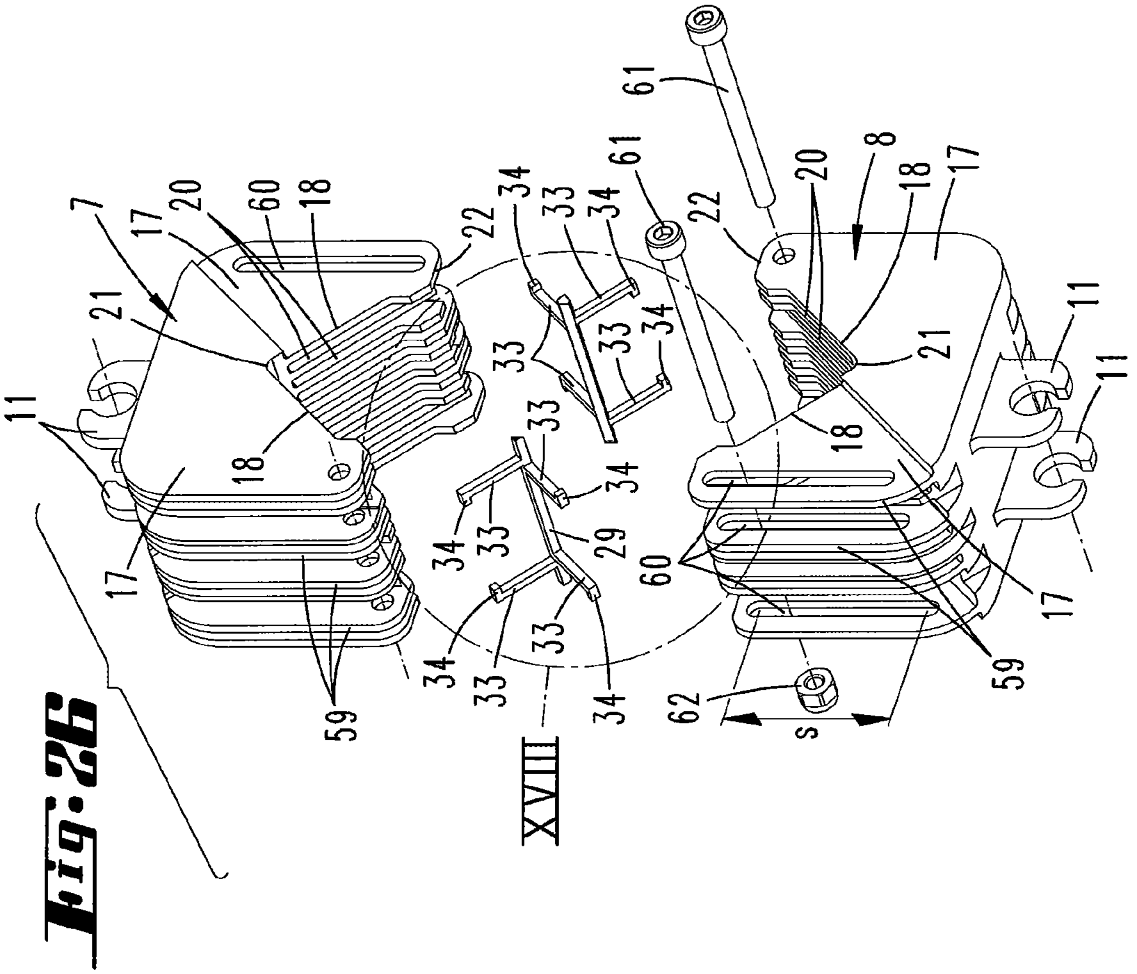
FIG. 26 the pressing jaws according to FIG. 25 in an exploded, perspective view with allocated supplemental pressing parts.
Figure 25:
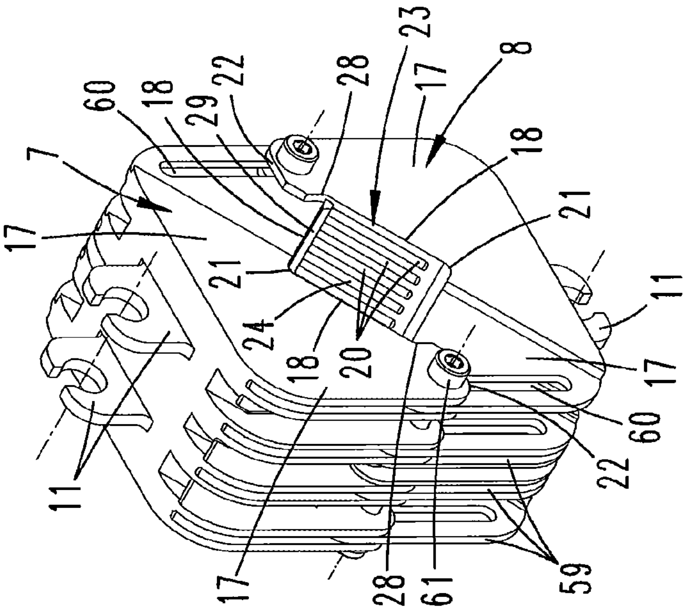
FIG. 25 a perspective, individual view of the pressing jaws of the third embodiment.

In order to immobilize the angle part 43 or its long side partial section 46, the top side of the long side partial section 46 is provided with an elongated projection 53, whose anterior front area 54 facing the narrow side part 45 is undercut (see FIG. 24). This projection 53 enters into a correspondingly formed and aligned longitudinal slit 55 of the longitudinal side part 47, wherein this longitudinal slit 55 also has an undercut front zone 56. In the closed position according to FIG. 24, the angle part 43 is thus positively held by its projection 53 in the longitudinal slit 55 of the long side part 47, so that the mounting head 9 can only be opened willfully.

The parts pivotably mounted around the bolts 51 can be spring loaded in the opening direction.

The long side parts 44 and 47 and possibly also the long side partial section 46 that supplements the interior of the long side part 47 can have carved into them two or more grooves that are arranged side by side, and run in a longitudinal extension of the mounting head 9, i.e., parallel to the longitudinal axis x of the pressing pliers 1, whose longitudinal axis x can correspond to a piston axis of the drive unit part 2. These can extend further over the entire length between the narrow side parts 45, and 48.

A carriage 57 is further preferably arranged between the two narrow side parts 48, which is preferably rearwardly connected with a drive element of the drive unit part 2, for example with a hydraulic piston or a spindle. This carriage 57 serves in particular to support the movable pressing jaw 8 received in the mounting head 9.

Pressing jaws 7 and 8 can be interchangeably received in the mounting head 9 configured in this way.

Two fastening means 58 each allocated to the narrow sides are provided for immobilizing the pressing jaws 7 and 8 in the mounting head 9. As depicted, these can be designed as positive locking pins that can be relocated perpendicular to the longitudinal extension L of the ribs 17 against a spring force, and interact with mounting brackets 11 of the pressing jaws 7 and 8.

For purposes of interacting with the grooves described above in a guiding manner, the pressing jaws 7 and 8 have ribs 59 that are correspondingly laterally aligned in the mounting head 9.

Beyond being mounted in the mounting head 9, the pressing jaws 7 and 8 of this third embodiment are preferably also directly connected with each other, so that these pressing jaws are always present in pairs even outside of the mounting head 9. The direct connection between the pressing jaws 7 and 8 can here preferably not be released without a tool.

For this purpose, each pressing jaw 7 and 8 can have an oblong hole 60 that penetrates through the pressing jaw 7 or 8 over the entire depth viewed perpendicular to the longitudinal extension L, wherein this oblong hole 60 is additionally aligned in the direction of the height extension H of the ribs 17.

In addition, each pressing jaw 7 and 8 carries a penetration pin 61 aligned in the depth direction of the pressing jaw 7 or 8, which is arranged outside of the pressing opening 24, just as the oblong hole 60 described above. The penetration pin 61 of the one pressing jaw is captured in the oblong hole 60 of the other pressing jaw. This results in a direct connection between the pressing jaws 7 and 8, while also forming a linear guide in the height extension H or in the entry direction r of the ribs 17.

According to a possible embodiment, the penetration pins 61 can be comprised of screws, which can be secured on the end side by securing means 62, for example in the form of nuts.

The oblong hole linear guide provides a stop on the respective end side. These stops can define the maximum entry position of the pressing jaws 7 and 8 and/or the maximum exit position of the pressing jaws 7 and 8. In particular, the maximum exit position (base position) of the pressing jaws 7 and 8 is defined by stops of the penetration pin 61 on the related end of the oblong hole 60, so that the pressing jaws 7 and 8, proceeding from a maximum entry position possibly likewise defined by the oblong hole 60, cannot be moved beyond a largest traversing distance s relative to each other, without the connection between the pressing jaws 7 and 8 first being released. The largest traversing distance s can correspondingly be defined by the maximum possible relocation path of the penetration pin 61 in the oblong hole 60 (see FIGS. 25 and 26).

As described above, the pressing jaws 7, 8 in this third embodiment can also be provided with supplemental pressing parts 29. Shown in this conjunction are supplemental pressing parts 29 with surfaces 31 that face the pressing opening 24 and help shape the opening contour K, on which a structure 32 is provided, for example for performing a symbol- or character-like embossing on the pellet 25 during the pressing operation, further for example a company designation, a logo or also information from which conclusions can be drawn about the performing person and/or the pressing date (see FIG. 30). The embossing through the structure 32 is part of the pressing contour P on the pellet 25.

In the case of a hydraulic pressing tool, for example of the kind known from WO 99/19947 A1 or WO 2017/129385 A1, the pressing jaws connected in such a way that, during an opening movement, only a traversing to the end of a largest traversing distance s arises, with the connection between the pressing jaws still being in place at this end, can have an advantageous effect, in that an automatic deactivation can thereby be achieved, even when returning the hydraulic piston. When changing out different pressing jaw pairs, the deactivation point corresponding to the end of this traversing distance arises immediately, even if the traversing distances vary for the different pressing jaw pairs. As soon as the end of the largest possible traversing distance has been reached, the hydraulic piston cannot run back further. A next pressing operation can then be carried out immediately proceeding from this position.

In the case of devices activated by electric motor, for example via the described spindle drive, a force sensor can in this regard be provided, which also leads to a deactivation once a specific force has been reached during retraction.

The above statements serve to explain the disclosures covered by the application as a whole, which each also independently advance the prior art at least by the following feature combinations, wherein two, several or all of these feature combinations can also be combined, specifically:

Pressing jaws, characterized in that a supplemental pressing part 29 is provided which, in addition to the ribs 17, forms part of the opening contour K, the supplemental pressing part 29 is arranged so as to run transverse to the marginal edges 18 while overlapping several ribs 17, and the intersection 28 is outside of the opening contour K.

Pressing jaws, characterized in that the supplemental pressing part 29 is movably arranged relative to the ribs 17.

Pressing jaws, characterized in that the cross-section of the supplemental pressing part 29 runs according to the legs of a triangle, at least in its surfaces 30 adjacent to the ribs 17.

Pressing jaws, characterized in that the supplemental pressing part 29 is positively mounted on one or both pressing jaws 7, 8.

Pressing jaws, characterized in that the supplemental pressing part 29 has one or several mounting arms 33, which proceed from the supplemental pressing part 29 in relation to the opening contour K and extend to the outside of the opening contour K.

Pressing jaws, characterized in that one or both pressing jaws 7, 8 have one or several mounting surfaces 35, along which a mounting arm 33 can slide during a pressing operation.

Pressing jaws, characterized in that the mounting arm 33 has a mounting projection 34, which extends at a right angle to the mounting arm 33.

Pressing jaws, characterized in that the mounting projection 34 interacts with the mounting surface 35.

Pressing jaws, characterized in that the supplemental pressing part 29 is provided with a structure 32 that serves to impart information on its marginal edge that forms part of the opening contour K.

Pressing jaws, characterized in that a supplemental pressing part 29 is provided which, in addition to the ribs 17, forms part of the opening contour K, the supplemental pressing part 29 is arranged so as to run transverse to the marginal edges 18 while overlapping several ribs 17, and the intersection 28 is outside of the opening contour K.

Pressing jaws, characterized in that the pressing jaws 7, 8 are directly connected with each other, so that, during an opening movement, the pressing jaws 7, 8 can only be moved relative to each other up to an end of the largest traversing path s at which the pressing jaws are still connected.

Pressing jaws, characterized in that one of the pressing jaws 7, 8 has a penetration pin 61 outside of the pressing opening 24, and the other pressing jaw 8, 7 has an oblong hole 60, and the penetration pin 61 is captured in the oblong hole 60.

A method, characterized in that a supplemental pressing part 29 is inserted into the pressing mouth 23 so as to change the pressing contour P of the pellet 25, in order to form a part of the opening contour K of the pressing opening 24 formed by the pressing jaws 7, 8, wherein the supplemental pressing part 29 is inserted so as to overlap an intersection 28 of the opening contour K formed by the entering ribs 17.

A method, characterized in that a supplementary pressing part 29 is inserted into the pressing opening 24 before the pressing operation starts, which forms a part of the opening contour K over a depth of the pressing opening 24, while crossing at least two ribs 17 of the same pressing jaw 7, 8 and overlapping the intersection 28, and the supplemental pressing part 29 is moved relative to the ribs 17 during the pressing operation.

A method, characterized in that, before the pressing operation starts, the supplemental pressing part 29 is provided with a structure 32 for imparting information on its marginal edge that forms a part of the opening contour K.

All disclosed features (whether taken separately or in combination with each other) are essential to the disclosure, especially invention-essentially. The disclosure of the application hereby also incorporates the disclosure content of the accompanying/attached priority documents (copy of the prior application) in its entirety, also for the purpose of including features of these documents in claims of the present application. Even without the features of a referenced claim, the subclaims characterize standalone inventive further developments of prior art with their features, in particular so as to submit partial applications based upon these claims. The disclosure indicated in each claim can additionally have one or several of the features indicated in the above description, in particular those provided with reference numbers and/or indicated on the reference list. The disclosure also relates to design forms in which individual features specified in the above description are not realized, in particular if they are recognizably superfluous with regard to the respective intended use, or can be replaced by other technically equivalent means.

REFERENCE LIST

| | | | |
|---|---|---|---|
| 1 | Pressing pliers | 29 | Supplemental pressing part |
| 2 | Drive unit part | 30 | Surface |
| 3 | Gripping area | 31 | Surface |
| 4 | Working head | 32 | Structure |
| 5 | Accumulator | 33 | Mounting arm |
| 6 | Activating key | 34 | Mounting projection |
| 7 | Pressing jaw | 35 | Mounting surface |
| 8 | Pressing jaw | 36 | Spring element |
| 9 | Mounting head | 37 | Wire |
| 10 | Screw | 38 | Wall |

-continued

| | | | |
|---|---|---|---|
| 11 | Mounting bracket | 39 | Surface |
| 12 | Borehole | 40 | Surface |
| 13 | Clamping sleeve | 41 | Notch |
| 14 | Borehole | 42 | Inclined surface |
| 15 | Receptacle | 43 | Angle part |
| 16 | Element | 44 | Long side part |
| 17 | Rib | 45 | Narrow side part |
| 18 | Marginal edge | 46 | Long side partial section |
| 19 | Base | 47 | Long side part |
| 20 | Entry opening | 48 | Narrow side part |
| 21 | Corner area | 49 | Flange |
| 22 | End face | 50 | Neck |
| 23 | Pressing mouth | 51 | Bolt |
| 24 | Pressing opening | 52 | Recess |
| 25 | Pellet | 53 | Projection |
| 26 | Wire end ferrule | 54 | Front area |
| 27 | Cable | 55 | Longitudinal slit |
| 28 | Intersection | 56 | Front zone |
| 57 | Carriage | G | Longitudinal direction |
| 58 | Fastening means | H | Height extension |
| 59 | Ribs | K | Opening contour |
| 60 | Oblong hole | L | Longitudinal extension |
| 61 | Penetration pin | P | Pressing contour |
| 62 | Securing element | | |
| 63 | Groove | | |
| 64 | Contacting point | | |
| 65 | Inward fold | | |
| | | a | Length |
| | | a' | Length |
| | | b | Length |
| | | b' | Length |
| | | c | Length |
| | | d | Height |
| | | r | Entry direction |
| | | s | Traversing distance |
| | | x | Longitudinal axis |
| | | α | Angle |

The invention claimed is:

1. Pressing pliers comprising:

first and second pressing jaws, the first and second pressing jaws being configured to move relative to each other in a traversing direction, each pressing jaw having ribs thereon, each rib being defined by a longitudinal extension transverse to the traversing direction, wherein entry openings are formed between adjacent ribs, wherein the ribs of the first pressing jaw are configured to move into the entry openings of the second pressing jaw during a pressing operation, and the ribs of the second pressing jaw are configured to move into the entry openings of the first pressing jaw during the pressing operation, wherein the first and second pressing jaws form a pressing mouth with an opening contour formed by free marginal edges of the ribs of the first and second pressing jaws, and the ribs of the first and second pressing jaws form an intersection that moves in a direction of the longitudinal extension during the pressing operation; and a supplemental pressing part between the ribs of the first pressing jaw and the ribs of the second pressing jaw, the supplemental pressing part forming a part of the opening contour, the supplemental pressing part having an extension transverse relative to the longitudinal extension of the ribs of the first and second pressing jaws, the supplemental pressing part overlapping at least two of the ribs of the first pressing jaw and the second pressing jaw and the intersection formed by the ribs of the first and second pressing jaws is outside of the opening contour.

2. The pressing pliers according to claim 1, wherein the supplemental pressing part is movably arranged relative to the ribs of the first and second pressing jaws.

3. The pressing pliers according to claim 1, wherein the supplemental pressing part has two surfaces which are angled relative to each other and engage with the ribs of the first and second pressing jaws.

4. The pressing pliers according to claim 3, wherein the supplemental pressing part extends in cross-section, at least in its regions abutting the ribs of the first and second pressing jaws, in relation to the surfaces corresponding to legs of a triangle.

5. The pressing pliers according to claim 1, wherein the supplemental pressing part is positively held on one or both pressing jaws.

6. The pressing pliers according to claim 1, wherein the supplemental pressing part has at least one mounting arm.

7. The pressing pliers according to claim 6, wherein the at least one mounting arm extends from the supplemental pressing part.

8. The pressing pliers according to claim 6, wherein the at least one mounting arm extends outside the opening contour.

9. The pressing pliers according to claim 6, wherein the supplemental pressing part has a plurality of mounting arms.

10. The pressing pliers according to claim 6, wherein one or both pressing jaws have at least one mounting surface along which the at least one mounting arm can slide in during the pressing operation.

11. The pressing pliers according to claim 10, wherein the at least one mounting arm has a mounting projection which preferably extends approximately at right angles to the at least one mounting arm.

12. The pressing pliers according to claim 11, wherein the mounting projection cooperates with the mounting surface.

13. The pressing pliers according to claim 1, wherein the supplemental pressing part is provided on its edge forming part of the opening contour with a structure serving to convey information.

14. An arrangement comprising:

a first pressing jaw and a second pressing jaw, the first and second pressing jaws being configured to move relative to each other in a traversing direction, each pressing jaw having ribs thereon, each rib being defined by a longitudinal extension transverse to the traversing direction, wherein entry openings are formed between adjacent ribs, wherein the ribs of the first pressing jaw are configured to move into the entry openings of the second pressing jaw during a pressing operation, and the ribs of the second pressing jaw are configured to move into the entry openings of the first pressing jaw during the pressing operation, wherein the first and second pressing jaws form a pressing mouth with an opening contour formed by free marginal edges of the ribs of the first and second pressing jaws, and wherein the ribs of the first and second pressing jaws form an intersection that moves in a direction of the longitudinal extension during the pressing operation, and a supplemental pressing part which forms a part of the opening contour in addition to the ribs of the first and second pressing jaws, the supplemental pressing part being arranged to extend transversely to the free marginal edges of the ribs of the first and second pressing jaws in overlapping relationship with a plurality of the ribs of the first pressing jaw and/or the second pressing jaw, and in that the intersection formed by the ribs of the first and second pressing jaws is outside the opening contour.

* * * * *